United States Patent [19]

Nicholson

[11] Patent Number: 5,293,554
[45] Date of Patent: Mar. 8, 1994

[54] PROGRAM CONTROLLED IRRIGATION SYSTEM

[76] Inventor: Laurence R. Nicholson, 13970 Red Dog Rd., Nevada City, Calif. 95959

[21] Appl. No.: 566,192

[22] Filed: Aug. 10, 1990

[51] Int. Cl.$^5$ .................................................. G06F 15/46
[52] U.S. Cl. ....................................... 364/420; 364/145; 137/624.2; 239/70
[58] Field of Search ................ 364/145, 420, 510; 137/624.11, 624.2; 239/69, 70

[56] References Cited

U.S. PATENT DOCUMENTS

| | | | |
|---|---|---|---|
| 4,165,532 | 8/1979 | Kendall et al. | 364/420 |
| 4,189,776 | 2/1979 | Kendall | 364/420 |
| 4,244,022 | 1/1981 | Kendall | 364/420 |
| 4,569,020 | 2/1985 | Snoddy et al. | 364/420 |
| 4,852,051 | 7/1989 | Mylne, III | 364/420 |

*Primary Examiner*—Jerry Smith
*Assistant Examiner*—Steven R. Garland

[57] ABSTRACT

A program controlled irrigation system (10) operates with two programs, Program A and Program B, for irrigating a plurality of zones. Selected zones are dedicated to the irrigation of grass, for example, under Program A while other zones are dedicated to the irrigation of shrubs, for example, under Program B. A total of six times for starting an irrigation cycle are available for both Programs A and B. Under program control, the six starting times can be allocated in any combination to Programs A and B. Further, starting times can be shifted readily between Programs A and B thereby providing flexibility to meet the changing demands in grass and shrub irrigation. Each zone is constantly monitored for overcurrent conditions wherein zone operation is terminated if the overcurrent of the particular zone is sustained beyond a set period. Also, if the current reaches an excessive level in a very short period, zone operation is terminated. Even though a single zone operation has been terminated as noted above, other zones can continue to operate unless the operation of two successive zones has been terminated whereupon the operation of the entire system 10 is terminated.

8 Claims, 5 Drawing Sheets

PROGRAM CONTROLLED IRRIGATION SYSTEM

BACKGROUND OF THE INVENTION

This invention relates to a program controlled irrigation system and particularly relates to a multiple program system for controlling the selective operation of irrigation facilities in a plurality of zones of an area to be irrigated periodically.

In the irrigation of large areas such as public parks, estates, golf courses and the like, water is pumped from a supply, through underground conduits and to valves strategically located at stations spaced about the area to be irrigated. A single valve is located at each station and facilitates the control of a sprinkler head to irrigate the area or zone in the vicinity of the particular valve and sprinkler head. Each of the valves are controlled, for example, through an electrical solenoid to facilitate the irrigation process in an orderly fashion.

Control systems have been devised in the past to facilitate the programmed control of irrigation systems under the selective direction of a human operator. Such systems could include, for example, a solid state electronic circuit which permits the operator to select the precise times for the various zones to be irrigated. An example of such a system of this type is disclosed in U.S. Pat. No. 3,869,854 which issued on Mar. 11, 1975. However, the electronic circuit approach is rather elaborate and presents a confusing interface to the operator.

With the advent of low cost microprocessor IC chips, more sophisticated irrigation control systems have evolved as shown in U.S. Pat. No. 4,176,395, which issued on Nov. 29, 1979, U.S. Pat. No. 4,189,776, which issued on Feb. 19, 1979, and U.S. Pat. No. 4,569,020 which issued on Feb. 4, 1986. Each of these systems presents a program-controlled process with selective operator interface through switches and/or pushbuttons on a console and provides the operator with flexibility in selecting and directing a sequential timed irrigation program.

In multiple program systems, two programs are used to control separate portions or modes of the irrigation system respectively to water grass, for example, on the one hand and shrubs, for example, on the other hand. Each program is independent of the other program and can be used only for the particular irrigation mode to which it is dedicated. Therefore, if each program had three available start times, then watering grass or shrubs would each be limited to three starting times. At times, it may be desirable to water certain zones of one mode more frequently than it is desired for the other zones. For example, new grass may be planted in one zone and would require more frequent watering than would normally be required for existing older grass in another zone and, in any event, more frequently than would be required for the shrubs. Therefore, it would be desirable to shift one or more start times from the program for the shrubs and use them temporarily to water more frequently the new grass. Such an option has not been available in the dual mode systems heretofore.

Infrequently, components of the irrigation system may become defective which could result in the draw of excessive current from the power source thereby leading to damage to parts of the system. Typically, at start up, the solenoids draw a high current to operate the solenoid and then drop to a lower level which holds the solenoids in the operated state. If an overcurrent condition occurs, for example because of a short circuit, over heating of and damage to switching elements associated with the solenoids could occur. Shutdown of the system then would be required to protect the system.

On occasion, excessive current is drawn during normal operation of the irrigation system but the current level quickly returns to a normal current level draw. Obviously, it would be desirable not to shut the system down on such temporary occasions of excessive current draw. Also, the irrigation system typically operates on the basis of controlling each valve independently of the other valves whereby, it would be desirable that the entire system not be shut down because of the failure of components associated with one zone and valve.

Notwithstanding the sophistication and capabilities of the above-noted patented systems, and the above-mentioned multiple program systems, there is a need for a multiple program system which is flexible to the extent that start times may be shifted readily from one program and applied to the other program to provide versatility in the irrigation system. Further, there is a need for a program system which will permit continued operation of the system despite an occasional draw of excessive current and will shut down only the defective portion of the system when the excessive current draw is sustained for an undesirable period.

SUMMARY OF THE INVENTION

In view of the foregoing problems, it is an object of this invention to provide a multiple program controlled irrigation system which permits flexibility in shifting starting times between programs.

Another object of this invention is to provide a program controlled irrigation system which observes actual defective conditions and shuts down only the defective portion.

With these and other objects in mind, the present invention contemplates a multiple program controlled irrigation system which includes a first means for applying an irrigation medium to a first zone and a second means for applying the irrigation medium to a second zone. Means are provided for establishing a first starting time and a second starting time at which dispensing of the irrigation medium may begin. Further, means are provided for selectively assigning the first and second starting times in any combination for controlling the first means and/or the second means to facilitate initiation of the application of the irrigation medium to the first and/or second zones. Finally, means are provided for shifting either or both of the first and/or the second starting times from an existing assignment to either of the first means or the second means to an assignment to the other of the first means or the second means.

The present invention further contemplates a program controlled irrigation system which includes means for applying an irrigation medium to a zone to be irrigated. Means are provided for supplying energy to the irrigation system in the format of a waveform to develop operating energy for the applying means to facilitate the application of the irrigation medium to the zone. Means further set a limit of waveform amplitude above which the applying means is drawing energy greater than is normally required for operation of the applying means. Means are also provided for monitoring the waveform of the energy supplying means to determine when the amplitude increases above the set limit. Finally, means are provided for measuring the time that the amplitude of the waveform remains above the set limit as an indication that the greater-than-normal energy draw is an excessive energy which is harmful to the applying means. Other objects, features and advantages of the present invention will become more fully apparent from the following detailed description of the preferred embodiments, the appended claims and the accompanying drawings.

DETAILED DESCRIPTION OF THE PREFERRED EMBODIMENTS

Figure 1:
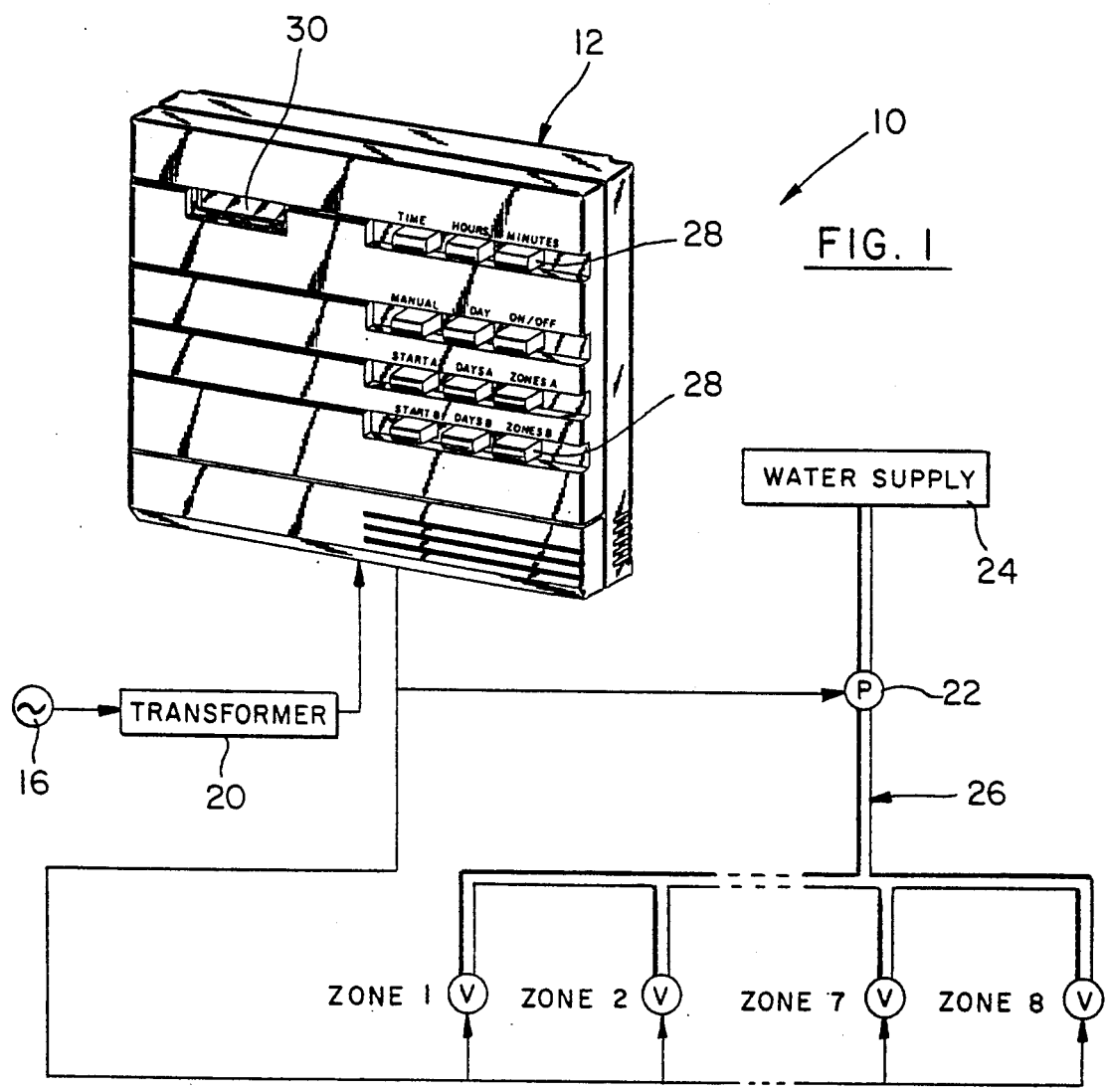
FIG. 1 is a view showing a multiple program controlled irrigation system including a control unit for facilitating the selective application of water to zones 1 through 8 in accordance with certain principles of the invention.
Figure 2:
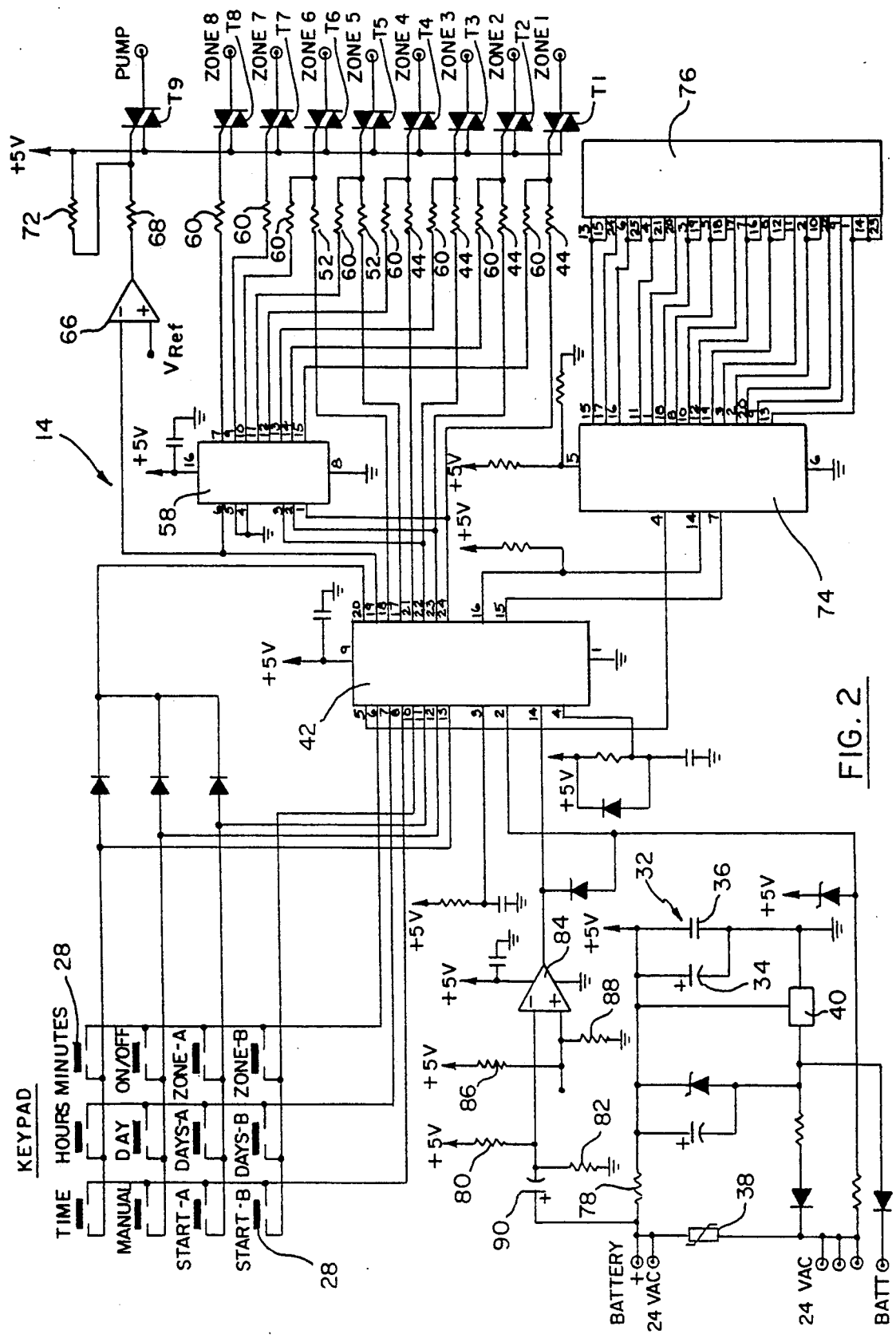
FIG. 2 is a schematic showing the electrical configuration of the portion of the irrigation system within the control unit of FIG. 1 in accordance with certain principles of the invention.

Referring to FIG. 1, a multiple program controlled irrigation system 10 includes a control console 12 which contains a programmed electrical circuit 14 as shown in FIG. 2. The circuit 14 is powered by a conventional AC source 16 (FIG. 1) of 120 volts at 60 Hertz. As shown in FIG. 1 the output of the AC source 16 is coupled through a step-down transformer 20 to provide an operating voltage of 24 volts AC at 60 Hertz to the electrical circuit 14 (FIG. 2).

The output of console 12 is coupled to a pump 22 to either turn on or turn off the pump. When the pump 22 is turned on, water is pumped from a water supply 24 and through a conduit system 26 to each of the eight valves "V" associated with eight watering zones 1 through 8 which designate areas to be irrigated. The valves "V" are electrically operated, for example, by solenoids (not shown) or other suitable electrical facilities. It is noted that irrigating fluids or media other than water could be used without departing from the spirit and scope of the invention. The output of console 12 is also coupled to each of the valves "V" to control the operation of the solenoids in the opening and closing of the respective valves.

Twelve keys or pushbuttons 28 form a keypad and are arranged in four rows of three each and extend from the front of console 12. Each key 28 is related to a specified input to the console 12 which is made by an operator-user to establish the desired operation of the system 10. The twelve selector options are illustrated on console 12 in FIG. 1. For example, the three keys 28 which form the top row of keys are related to "TIME," "HOURS" and "MINUTES." A display window 30 is also located on the front of console 12 to provide a display of data for the operator-user.

Referring now to FIG. 2, circuit 14 includes a low-voltage D.C.power source 32 the input of which is coupled to the output of transformer 20 (FIG. 1). This provides a 24 volt AC input at 60 Hertz to power source 32 which develops a +5 volts DC output across the parallel combination of capacitors 34 and 36. As shown, the low voltage D.C. power source 32 provides +5 volts to different portions and components of circuit 14. Power source 32 includes a varistor 38 connected across the 24 volts AC input terminals to protect against surge damage. Surge suppression could be provided by connecting a varistor on the input side of transformer 20. Power source 32 also includes a voltage regulator 40 which insures that the output voltage is well regulated. Voltage regulator 40 could be, for example, a model 7905 available from National Semiconductor of Santa Clara, Cal.

The heart of circuit 14 is a microprocessor 42 which could be a model COP445L available from National Semiconductor of Santa Clara, Cal. The program or software, which together with the hardware components form the irrigation system 10, is stored in microprocessor 42 and is set forth in the form of a source code listing appended hereto and titled "APPENDIX."

As noted above, keys 28 are connected to microprocessor 42 to provide facility for the operator-user to input instructions for responsive action under control of the program to operate the hardware components of the irrigation system 10.

As illustrated further in FIG. 2, four output pins of microprocessor 42 are connected through respective resistors 44 to the gate electrodes of four respective triacs T1 through T4. Further, two other output pins of microprocessor 42 are connected through respective resistors 52 to the gate electrodes of a respective pair of triacs T5 and T6. Also, four output pins of microprocessor 42 are connected to input pins of a decoder chip 58 which could be a model 74HC138 available from National Semiconductor of Santa Clara, Cal. Eight output pins of decoder chip 58 are connected respectively through eight resistors 60 to fate electrodes of respective triacs T1 through T8. Still another output pin of microprocessor 42 is connected to the inverting input of an inverting comparator 66. The output of comparator 66 is connected through a resistor 68 to the gate electrode of a triac T9. The gate electrode of triac T9 is also coupled through a resistor 72 to the 5 volts DC of the low voltage power source 32.

The input electrodes of triacs T1 through T8 are connected to the 5 volts DC of the low voltage power source 32 while the output electrodes of these triacs are connected respectively to the electrical control devices of valves "V" (FIG. 1) associated with zones 1 through 8. Also, the input electrode of triac T9 is connected to the 5 volts DC while the output thereof is connected to the electrical control device for pump 22 (FIG. 1).

Three additional output pins of microprocessor 42 are connected to a display driver chip 74 which could be a model COP472N available from National Semiconductor of Santa Clara, Cal. and which processes and feeds display data to a liquid crystal display 76 which is visible through window 30 (FIG. 1) of console 12.

An electronic circuit breaker forms a part of irrigation system 10 and includes a current sensing resistor 78 which is connected in the low voltage power source 32 to sense the level of current drawn, for example, by and through triacs T1 through T9 and the valve control devices such as, for example, solenoids. A voltage divider which includes a pair of resistors 80 and 82 provides a standard voltage which is applied to the negative or inverting input of a current detection comparator 84. Another voltage divider which includes a pair of resistors 86 and 88 provides a fixed reference voltage VREF which is applied to the positive or noninverting input of comparator 84. When excessive current is drawn through low voltage power source 32, the small increase in the voltage drop across the current sensing resistor 78 is coupled through a capacitor 90 to vary the standard voltage applied to the negative input of comparator 84.

Since resistor 78 is located at the input side of voltage source 32, the resistor, in effect, is responsive to the varying voltage of each positive half cycle of the 24 VAC source. If the current drawn through the triacs T1 through T9 is high or excessive, the positive half cycle of current through resistor 78 will be high in amplitude thereby providing a higher voltage across the resistor for a period longer than normal. The longer time at the higher voltage results in an output pulse from comparator 84, the width of which is indicative of the level and occurrence of overcurrent. The pulse width output of comparator 84 is coupled to microprocessor 42 to provide indication of the overcurrent condition. The microprocessor 42 responds to such a condition in a manner to be described hereinafter to provide indication of the overcurrent condition to terminate watering in the defective zone and, in some instances, to shut down system 10.

It is noted that the voltage VREF is also applied to the positive input of comparator 66 to facilitate the inversion of the voltage applied to the negative input of the comparator.

Circuit 14 is designed to accommodate an irrigation system 10 which can be constructed initially to irrigate four, six or eight zones. If circuit 14 is to provide control of irrigation in the four-zone mode, resistors 44 are connected in the circuit and to the gate electrodes of respective triacs T1 through T4. Resistors 52 and 60 are not connected in circuit 14 for the four-zone mode. If circuit 14 is to provide control of irrigation in the six-zone mode, resistors 44 and 52 are connected in the circuit to the gate electrodes of triacs T1 through T6 as illustrated in FIG. 2. Resistors 60 are not connected in circuit 14 for the six-zone mode. Finally, when circuit 14 is to operate in the eight-zone mode, resistors 60 are connected in circuit 14 to the gate electrodes of respective triacs T1 through T8. Resistors 44 and 52 are not connected in circuit 14 for the eight-zone mode.

Thus, while the illustration of circuit 14 in FIG. 2 shows resistors 44, 52 and 60 connected in the circuit, it is to be understood that these resistors are actually factory-connected in the circuit only in the zonal modes as described above.

The multiple program controlled irrigation system 10, as noted above, can provide irrigation for four, six or eight zones with each zone containing a valve and can operate with a maximum of three valves at one time. The system 10 includes two completely independently programs, Program A and Program B, with a maximum of six watering start times which are assignable in any combination to either of the programs. For example, all six starting times could be assigned to one program leaving no starting times to be assigned to the other program. Or one to five starting times could be assigned to one program with the remainder being assigned to the other program.

The system 10 provides for watering for one to seven day intervals or can provide seven-day weekly programming for each program and can provide form one to 99 minutes of watering. System 10 also includes a twelve-hour clock with AM/PM capability.

The twelve pushbuttons 28 relate to the following twelve activities as illustrated in FIGS. 1 and 2:
1) Time
2) Set Hours/Zone ten's digit
3) Set Minutes
4) Manual/Pause
5) Day
6) On/Off
7) Start A
8) Days A
9) Zones A
10) Start B
11) Days B
12) Zones B The programs of system 10 can be adjusted at the factory to select an operational frequency of either 50 Hertz or 60 Hertz. Also, a battery back-up can be provided across the BATT terminals at the input of the low voltage power source 32 as illustrated in FIG. 2. Without the battery in circuit 14, the triacs T1 through T9 are "on" for only two or three cycles after power up which could result in the valves "V" being turned on for this brief period. Also, the battery will maintain the programmed watering schedule in memory of microprocessor 42 in the event there is a temporary power failure.

With respect to the following description of operation of system 10, including the multiple programs as set forth in the source code listing of the APPENDIX and as contained within microprocessor 42, pushbuttons 28 will be referred to as keys. For example, TIME pushbutton 28 will be referred to as the TIME key.

The TIME key can be used to select a time-of-day display which appears on display 76 whereafter the HOURS key and the MINUTES key can be used to set the time of day in a clock which is contained within microprocessor 42 and from which the operation of system 10 is clocked.

The multiple programs of irrigation system 10 are identified hereinbelow as Program A and Program B. The keys associated with the respective programs are identified by the same letter designation. For example, the START A key relates to the watering start times of Program A, the DAYS A key relates to the selected watering days associated with the start times of Program A and the ZONES A key relates to a grouping of watering zones associated with Program A.

The DAY key selects the day-of-week display in the weekday mode on display 76. The DAY key also selects the day interval "Today" display in the interval mode on display 76 which represents that, under Program B, the interval of watering is every fourth day. If a program is in the interval mode and the display shows start times, days or zones for that program, pressing the DAY key will always show on display 76 the "Today" display for that program. If the program is in the weekday mode, the day-of-week display appears on display 76.

System 10 is designed so that set keys can make an active entry only during a period which begins when a function key has been pressed and terminates within 28 to 32 seconds thereafter. Subsequent to that period, the set keys are locked out to prevent inadvertent changes to the watering schedule of system 10.

Each depression of a set key automatically increments the value appearing on the display 76. Continued depression of the set key will result in automatic fast increment of the value displayed every one-quarter second after an initial three-quarter second delay. When setting the minutes value of either a zone or the time of day, the fast increment mode actually increments two minutes every one-quarter second. Further, by pressing the HOURS key when in the zone mode, the ten's digit of the zone time is incremented Under the multiple programs, there are a total of six start times that are, in effect, shared by Program A and Program B. Each start time can be used for either Program A or B but not simultaneously for both. To access multiple start times, the START A key or START B key of the selected program is pressed repeatedly to sequence through all programmed settings for that program. Each start time can either be displayed as a time or, if disabled, will be displayed as "OFF." Since the number of start times in a program is variable, the programmed start times for the selected watering program are displayed in sequence, followed by the display "OFF" thereby indicating the end of the sequence. To change an existing start time, the operator-user selects the existing start time to be changed and sequences through the start times until that start time appears on display 76. Thereafter, the operator-user increments the time to establish the new start time which is attained when it appears on display 76. To enter or add a start time to the program, the operator-user sequences or advances through the existing start times to the "OFF" display and thereafter enters the desired additional start time. The ON/OFF key is then depressed to toggle the start time on.

If there are no start times available when the setting of a start time is attempted, there will be no response and "OFF" will continue to appear on display 76. The operator-user must turn off, in either program, or select an existing start time and overwrite another start time.

A start time can be toggled on and off by use of the ON/OFF key. In the OFF position, a start time is available for reprogramming into either watering program. When toggled back on, the "minutes" of the start time are reset to ":00" but the "hours" setting remains. Under system 10, it is possible to move a start time from one program to the other by turning off the starting time in the one program and then turning it on in the other program. In this instance, the "hours" setting will be retained.

The introduction of a start time into either Program A or Program B, and the shifting of start times from one program to the other, will be described in more detail hereinafter with respect to the flow chart of FIG. 3.

At power up, one start time is set to 2:00 AM in Program A. All other start times are "OFF" and will come up as 12:00 AM when turned on.

Start times are stacked, allowing several to overlap without missing any watering cycles. At midnight, all stacking is cleared and only the currently active cycle is completed. For drip irrigation applications, several start times can be set to the same time within a program and the zones will run several times, thereby extending total watering time to a maximum of nine hours and fifty-four minutes per zone. This figure is obtained by multiplying the maximum number of starting times (6) times maximum operating time (99 minutes) for each starting time.

Each watering program has its own days setting, thereby allowing either day-interval watering (interval mode) or weekday watering (weekday mode). The particular mode is selected independently for each program.

In the interval mode, the DAYS A or B key has three positions. The first position is the day interval setting ("Days every N"). The second position is "today" and the third position is "Week days OFF." Depressing the MINUTE key in the first and second positions increments the corresponding value. The setting advances from 1 to 7 days and then sets "Today" to the same day so that watering will always occur later in the same day if a start time is programmed. The "Today" setting can then be set to any day from one to the setting value.

Also in the interval mode, watering will occur if "Today" is the same as the day setting. "Today" is incremented at midnight and is limited to the day setting.

In the "Week days OFF" position, the operator user is given the option to switch to a weekday operation. Depression of the ON/OFF key will result in the turning on of the weekday mode. This action does not actually turn on a weekday but simply turns on the mode of operation whereby the expression "Weekday 1 OFF" may appear in display 76 if the setting was previously off.

In the weekday mode, the DAYS A or B key sequences the number on display 76 (i.e. 1 to 7) and either "ON" or "OFF" thereby indicating the days of the week in which watering will occur. By pressing the ON/OFF key, the day on and off is toggled. By pressing the DAY key in either program that is in the weekday mode, display 76 will switch to display the current day of the week.

After day 7 has been displayed, the next display allows the operator-user to flip the mode to day intervals (i.e. the interval mode) which is displayed as "Days every OFF." By pressing either the ON/OFF key or the MINUTES key, the mode will flip to intervals for the selected watering program A or B.

The interval setting, interval day and the week day settings are all preserved when changing modes so that the operator-user is not penalized for changing modes. Further, the operator-user may set the weekday mode for non-restricted watering periods and the interval mode for watering rationing periods, then easily flip between then as required.

By pressing a program zone key, such as the ZONES A or ZONES B key, the operator-user steps sequentially through the zones thereby allowing a review of the run time of each zone for the selected program. By pressing the MINUTES key, the operator-user increments by minutes from one to ninety nine minutes in auto-increment mode (i.e. holding the MINUTES key depressed), the zone minutes are incremented in two minutes to advance the programming rapidly. The "zero minutes" position appears on display 76 as "OFF." By pressing the HOURS key, the tens digit of the time setting is incremented to allow for rapid setting of all six zones. The ON/OFF key is used to toggle the zone "off" and then "ON." When first turned "ON" from the "OFF" position, a zone is set to one minute. At power up, all zones are set to five minutes each in watering Program A.

Zones are added to a watering program by setting a watering time in the selected program. Zones can be set only to one program. Further, if a zone is set in a first program, and is then reprogrammed into a second program, it will be deleted automatically from the first program thereby simplifying the operation by the operator-user.

In either the time-of-day mode or the day-of-the-week, pressing the ON/OFF key disables all watering (which represents a "rain mode") and "OFF" flashes on display 76. Pressing the ON/OFF key again will toggle the time of days on display 76.

The manual modes are selected by use of a four-step menu by pressing the MANUAL key. The four-step menu includes (1) run both programs (i.e. Manual A/B), (2) Run Program A, (3) Run Program B, and (4) Run a single zone. Pressing the ON/OFF key turns on the selected cycle. Pressing the ON/OFF key again cancels the cycle. Pressing the ZONES A or ZONES B key at any time while in the manual mode before the cycle has started directly selects the manual zone mode. Pressing the MINUTES key while in the manual zone mode modifies the run time for the manual cycle only. In any manual program mode (i.e. A/B, A, or B), ZONE 1 is always displayed and its time can be changed but will not affect the manual cycle time. Further, the "manual" icon flashes on display 76 when operating in the manual mode.

Functions which are allowed during watering include pause, cancel water cycle, and increment to next zone (i.e. manual advance). During these functions, all programming functions are disabled.

During watering, the current zone number is displayed on display 76 in a left digit position while the time remaining in the watering cycle alternates with the word "On" in a right digits position. The word "zone" will appear on display 76 unless it is a manual program cycle. In the manual mode the "Manual" icon flashes on display 76. In all modes, the current Program A or B will appear on display 76.

The pause mode is entered while watering by pressing the manual key. All watering is suspended until midnight at which time a paused cycle will be cancelled automatically. During the pause mode, the expression "PSE" will flash on display 76.

The watering cycle can be manually advanced to the next zone by pressing the ZONES A or ZONES B key. This is used primarily for rapid testing of all zones.

By pressing the ON/OFF key during a period when watering is in progress, the current water cycle and any stacked and waiting water cycles will be cancelled.

Upon power up, the clock within microprocessor 42 is set to 4:00 PM, day 1, with Program A set to start at 2:00 AM every day and with zone times set for five minutes each on Program A. Program B is empty. The interval mode/weekday mode is set to weekdays for both programs. Display 76 will flash continuously until any key is pressed thereby indicating that a complete reset has occurred. If the memory is valid, all initialization is bypassed and display 76 does not flash.

Each time a key is pressed, a timer within microprocessor 42 is restarted for about 28 to 32 seconds, as noted hereinabove. The set keys are only active if the next key is pressed within the 28–32 second window thereby preventing accidental changes also as noted above. Further, automatic watering starts are prevented during this time thereby preventing a start from locking out operator-user keypad functions. If a start time is encountered while reviewing or programming, it is "stacked" and held until 28–32 seconds after the last key was pressed thereby allowing the operator-user to complete assigned tasks.

At the end of the 28–32 second period, the system will remain in the selected mode until a watering cycle occurs whereafter the display 76 will show the watering data and will then revert to displaying the time of day.

In conjunction with comparator 84 (FIG. 2) and associated portions of the program stored in microprocessor 42, irrigation system 10 includes the electronic circuit breaker as previously noted. The breaker is operated upon the draw of excessive current through any of triacs T1 through T9 as noted above. When the breaker is operated or trips, the word "FUS" appears on display 76. The zone involved with the excessive current draw is turned off and system 10 advances immediately to the next programmed zone. If two such failures or fuse actions occur in succession, all watering is cancelled. Completing one minute of watering time, cancelling of all watering cycles, or passing midnight will reset the sequence counter and again allow for normal fuse or breaker operation.

The circuit breaker trips under two conditions. Under the first condition, which is referred to as the normal mode, the breaker trips if current through a triac to a valve exceeds a set limit for 9 to 11 cycles of the 60 Hertz line input to low voltage power supply 32. This represents about 150 milliseconds. Under the second condition, which is referred to as the fast mode, the breaker trips within 2 to 3 cycles of the 60 Hertz input after an excessive current to the valve occurs. This should prevent the loss of triac control in the event of a dead short. Tripping of the circuit breaker in response to the fast mode condition turns off each of the individual triacs T1 through T9 before the triac heats up to the point of losing operational control of the triac. The trip level for the fast mode is about 2.5 to 3 amps (rms). The excessive current is detected by measuring the amount of time that the current waveform exceeds the lower limit. The trip time is about 5 to 5.5 milliseconds per pulse at 60 Hertz and slightly longer for 50 Hertz. Due to the variations of the speed of the clock of microprocessor 42, the same correction that keeps the time of day accurate during a power outage is also used to correct the measurement of the fuse pulses. When system 10 is initially powered on, the above-noted correction is set such that the fast mode fuse in more sensitive to prevent a wiring short from going undetected.

The electronic circuit breaker will be described in more detail hereinafter with respect to the flow chart of FIGS. 4 and 5.

The following is a brief restatement of the manner in which the operator-user interfaces within the program set forth in the source code listing of the APPENDIX and as stored in microprocessor 42. Such interfacing occurs through use of the various keys 28 as described below.

The operator-user initially sets the current time by pressing the TIME key and then pressing and holding down the HOURS key until display 76 shows the current hour and "A" for AM or "P" for PM. The MINUTES key is then pressed and held until the current minute is displayed.

To set the current day number, the DAY key is then pressed and released. The MINUTES key is then pressed repeatedly until the number representing the current day is displayed. The days are presented by a numbering scheme in which number one represents Sunday, number 2 represents Monday, and so on. The TIME key is thereafter pressed to return to the clock mode.

The operator-user then selects the times of the day that each Program A or B will begin watering the zones. As noted above, the program is designed to allow the setting of up to six start times per day shared in any combination between Program A and Program B.

To set the start times for Program A, press the START A key, release the key and then press the HOURS key and hold until the desired hour and A or P are displayed. Then release the HOURS key and press the MINUTES key and hold until the desired minute is displayed whereafter the MINUTES key is released. This pattern is repeated to set additional start times for all zones in Program A. The TIME key is then pressed to return to the clock mode. To set the start times for Program B, press the START B key and proceed with depression of the HOURS and MINUTES keys in the same manner as described above with respect to setting start times for Program A.

As noted above, system 10 provides a wide range of watering periods, which may vary from one to 99 minutes, to provide precisely the proper amount of water to each zone. In setting the run times for the zones under Program A, press the ZONES A key once whereby display 76 shows that Zone 1 is set under Program A to run for five minutes on the days assigned to Program A. If the operator-user wants Zone 1 to remain in Program A, the MINUTES key is pressed and held until the desired run time appears on display 76. To remove Zone 1 from Program A, the ON/OFF key is pressed to display "OFF." The ZONES A key is then pressed and the above steps using the MINUTES key and the ON/OFF key are repeated until all zones have been set to the desired run times or to the "OFF" display. The TIME key is then pressed to return to the clock mode.

To set the run times for the zones under Program B, press the ZONES B key to display "OFF." This indicates that Zone 1 is not set to run in Program B because it may assigned to Program A. To transfer Zone 1 to Program B, press the MINUTES key until the desired run time appears with the displayed figure beginning at one and increasing up to 99. To retain Zone 1 in Program A, press the ZONES B key. Continue pressing the ZONES B key and repeat the steps above with respect to use of the MINUTES key and the ZONES B key to set the zones of Program B until all Program B zones have been set to the desired run times or to the "OFF" display. All zones which are not connected or that the operator-user does not wish to water must be set to "OFF." This is accomplished by pressing the ZONES A key repeatedly until each zone number which is to be set to "OFF" appears on display 76, then press the ON/OFF key until the display indicates "OFF." Repeat this sequence using the ZONES B key for all unused zones in Program B.

As noted above, by use of system 10, a group of zones can be programmed to water either on specific days of the week (i.e., Sunday through Saturday) or at specific intervals between watering days (e.g., every day, every second day, etc.). When using the multiple program controlled irrigation system 10, the operator-user could schedule the zones of Program A to water by days of the week and the Zones of Program B to water by day intervals.

To set a program to water on specific days of the week, press DAYS A whereby the number one and the word "ON" are displayed to indicate the selection of Sunday. If the operator-user does not want the zones of Program A to water on Sunday, the ON/OFF key is pressed until "OFF" appears on display 76. Again press the DAYS A key to display day two (Monday) and set to "On" or "OFF" by pressing the ON/OFF key again. These steps are repeated until all seven days of the week have been set and "OFF" appears on display 76. The TIME key is then pressed to return to the clock mode.

The same steps are followed to set Program B for specific days of the week by using the DAYS B key.

To set a program for day intervals between watering days, press the DAYS A key repeatedly eight times until "DAYS EVERY-OFF" is displayed. Then press the MINUTES key repeatedly until the number of days desired between waterings appears. Under this scheme, the numeral "1" indicates watering every day, "2" every other day, "3" every third day and so on. Press the TIME key to return to the clock mode.

The same steps are to be followed using the DAYS B keys for Program B to water by day interval.

As an example of using system 10, assume that, for lawn areas, zones are to be assigned to Program A for watering Monday, Thursdays and Saturdays. For shrub areas, zones are to be assigned to Program B to water every other day. With this watering program, start times could be set (up to a total of six per day) for both programs.

To input the watering program, the start times for Program A are set at 6:00 AM and 2:00 PM. The watering cycle will begin at 6:00 AM in the lowest-numbered zone assigned to Program A and progress sequentially through all zones assigned to this program. The watering cycle will begin again at 2:00 PM. The start time for Program B is set at 10:00 AM. Thus, the watering cycle for the lowest-numbered zone assigned to Program B will start at 10:00 AM and progress sequentially through all other zones assigned to his program.

Thereafter, Zones 1 through 4 are set to water the lawn areas for 15 minutes each under Program A and Zones 5 and 6 are set to water the shubbery for 15 minutes each under Program B.

Selective watering of a single zone at a time can be accomplished by pressing the MANUAL key once, then repeatedly pressing the ZONES A and ZONES B keys to advance to the zone number to be watered. Then press the ON/OFF key once to initiate the watering of the selected zone. During this period, the display will flash "MAN," the zone number being watered, and the minutes remaining in the watering cycle. Only the selected zone will be watered under the "manual" mode which can be cancelled at any time by pressing the ON/OFF key.

It is also possible to water all of the zones in a semi-automatic mode in both Program A and Program B. To enter this mode and water once, and in sequence, all zones in Program A and Program B, press the MANUAL key once and then the ON/OFF key once. The display 76 will flash "MAN," the zone number being watered, and the minutes remaining. Press the ON/OFF key at any time to cancel the manual mode. To water once, and in sequence, only zones in Program A, press the MANUAL key twice and then the ON/OFF key once. The display will flash "MAN," the zone number being watered, and also count down the minutes remaining. The manual mode can be cancelled at time by pressing the ON/OFF key. To water once, and in sequence, only zones in Program B, press the MANUAL key three times, then the ON/OFF key once. The display will flash "MAN," the zone being watered and also count down the minutes remaining. The manual mode again may be cancelled at any time by pressing the ON/OFF key.

If it is desired to interrupt or "freeze" a manual or semi-automatic watering cycle at any point in the run time of zone, then the MANUAL key should be pressed. In this instance the display will flash "PSE" for pause. To resume the watering cycle, press the MANUAL key and the zones count will continue. If the system is in the pause mode at midnight, the system is automatically reset and will resume its normal programmed schedule.

To prevent automatic watering when no cycle is in progress, for example, when rain is expected, press the ON/OFF key once whereby the display will flash "OFF." The automatic watering can be resumed by again pressing the ON/OFF key.

As noted above, if the system detects a short circuit, it will automatically turn off power to the valve control of the defective zone. The display will flash "FUS," the defective zone's number and the run time. The system will continue to automatically water all other zones and continue the programmed watering cycles while the display continues flashing the defective zone number. After the defect is repaired, the system and display 76 is returned to normal operations by pressing the TIME and START A or START B keys.

Figure 3:
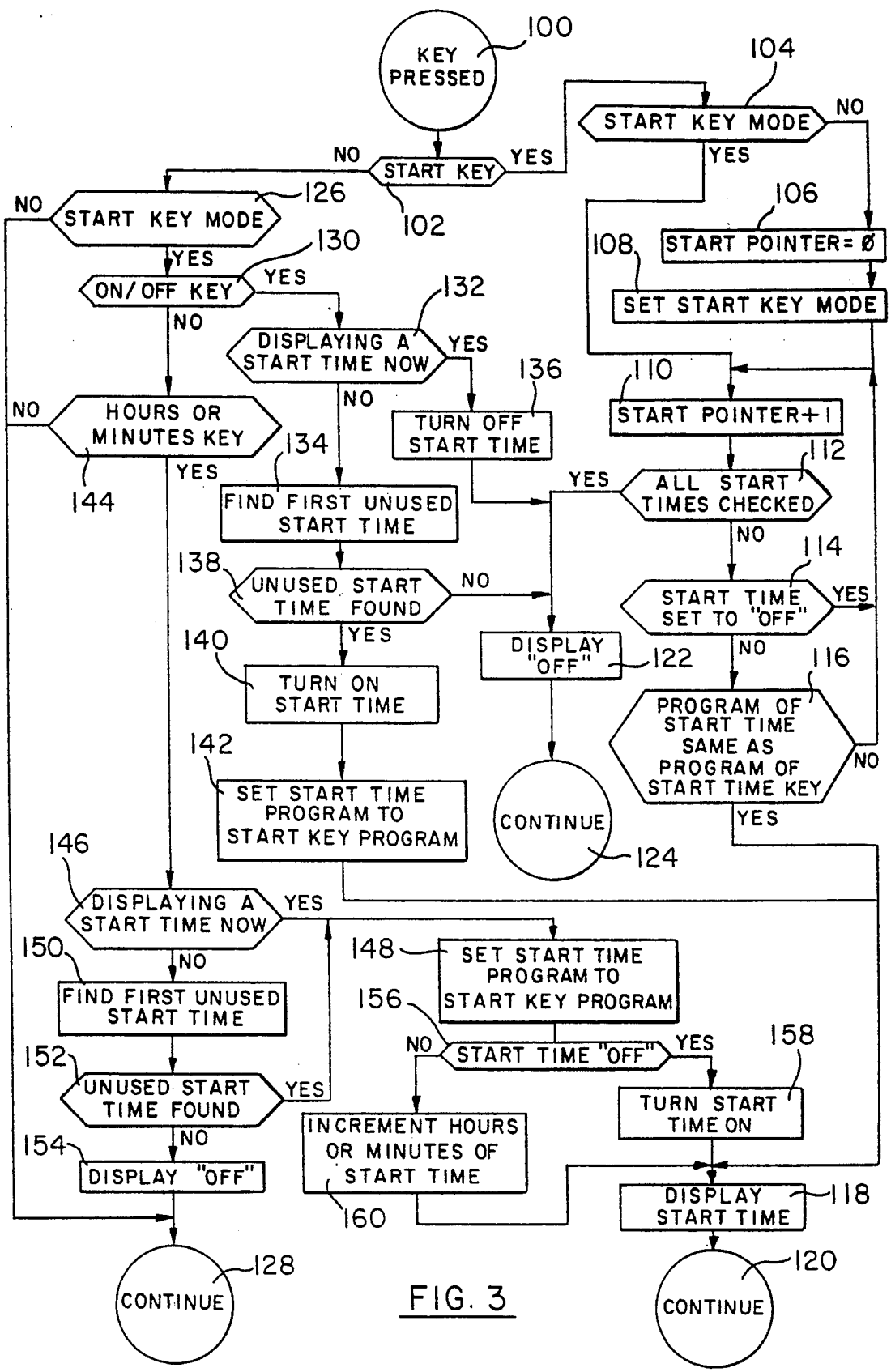
FIG. 3 is a flow chart illustrating in accordance with certain principles of the invention the manner of placement of an irrigation start time for one of the zones of FIG. 2 into a selected one of two program modes notwithstanding that the start time when located was in the other of the two program modes.

Turning now to FIG. 3, there is illustrated a flow chart depicting that portion of the program or software which is stored in microprocessor 42 and which relates to the assignment of any combination of the six starting times to Programs A and B and to the shifting of start times from Program A to Program B or vice versa. It is noted that there are three options for the placement or assignment of a starting time. A starting time can be assigned to Program A, to Program B or to the "OFF" mode. If a start time is in the "OFF" mode, it is available for assignment to either Program A or B.

For purposes of describing this portion of the program relating to the flow chart of FIG. 3, it will be assumed that depression of each key will occur within 28-32 seconds of depression of the preceding key whereby the system does not have sufficient time to reset. Also, it is assumed that the system is not in a start key mode initially and that all six starting times have been assigned to Program A while none have been assigned to Program B.

Initially, the operator-user desires to determine how many of the six starting times have been assigned to Program A and what the specific times are. The START A key is depressed in circle 100 which is questioned in block 102 as to whether a start key was depressed. Since the answer is "yes," the program proceeds to ask the question in block 104 as to whether the system is in a start-key mode. In this instance, the answer is "no" so the program proceeds to initialize a start pointer in block 106 by setting the pointer to a zero location. The pointer is associated with the six locations of the six starting times, for example, numbered one through six. The zero location is an imaginary location functioning as a starting or initializing point which serves as a base or initial starting point from which the the six starting times are located After the start pointer is set to equal zero, the system is then set in a start key mode in block 108. The start pointer is then incremented by one in block 110 whereby the system moves to location one. In block 112 a question is asked as to whether all start times have been checked and the answer is "no," so the processor proceeds to block 114 and asks whether the start time is set to "OFF." If the start time has been assigned to the "OFF" mode, the processor will loop back to block 110 and increment the start pointer to location two to process the second start time. However, since there is a specific start time assigned to location one, the processor progresses through block 114 to block 116 where a question is asked as to whether the program of the start time (A or B) in position one is the same as the program of the start key (A or B) which was initially depressed. Since all six start times are assigned to Program A, and since the key depressed was the START A key, the answer is "yes" and the processor advances to block 118 to display the start time of location one on display 76. The processor then continues through circle 120 to perform other functions of the overall program of system 10 not associated with the flow chart on FIG. 3.

After observing the display start time, the operator-user again depresses the START A key for the second time in circle 100 and the processor advances through block 102 to block 104. Since the start key mode has been set previously in block 108, the processor now advances directly to block 110 where the start pointer is incremented by one count to location two. The processor now proceeds through blocks 112, 114 and 116 to block 118 to display the starting time assigned to location two. The operator-user again depresses the START A key and the processor progresses in the same manner as the most recent process to display the starting time in location three. This pattern is continued to display the starting time in locations four through six. The operator-user again depresses the START A key and the processor progresses through blocks 102, 104, 110 to 112 where the answer is "yes" as to whether all start times have been checked. The processor then advances to block 122 to display "OFF." The processor then continues through circle 124 performing other functions of the overall program of system 10 not associated with the flow chart of FIG. 3.

Assume now that the operator-user wishes to determine whether there are any start times in Program B or wishes to shift one of the six start times from Program A to Program B. The START B key is pressed and the processor progresses through block 102 to block 104. Since the system is still in the start key mode, the processor progresses through block 110 while incrementing the start pointer by one count. The processor then progresses through block 112 to block 114. If the first start time is set to "OFF," which in this example it is, the processor loops around to block 110 to increment the start pointer by one count. Otherwise the processor proceeds through blocks 112 and 114 to block 116 where a question is asked as to whether the program of the start time is the same as the program of the most recently pressed start key. In this instance, it is not the same. So the processor loops around to block 110 and continues processing in this fashion through all of the remaining start times which, as noted above, have been assigned to Program A.

Eventually, all start times have been checked and the decision response from block 112 directs the processor to block 122 to display "OFF." Since there were no display instructions to block 118 during the period when the processor was processing the instruction related to depression of the START B key, the display has remained in the "OFF" mode. This indicates to the operator-user that there are no start times assigned to Program B.

Now assume that the operator-user desires to assign at least one start time to Program B. This requires that one of the six start times be shifted from Program A to Program B.

Initially, the operator-user depresses START A key to pull up the successive displays of the start times assigned to Program A in accordance with the process described above. The operator-user selects and displays the start time of Program A which is to be shifted to Program B and then presses the ON/OFF key to turn off the start time whereby the display shows "OFF." This start time is now available for reassignment.

The operator-user then depresses the START B key to establish that the program the start time is to be shifted into is Program B. The processor will progress through the portion of the flow chart of FIG. 3 which begins with block 104 in the manner described above. Since there are no start times in Program B, the display will continue to show "OFF" as described above.

The operator-user now has three options for proceeding to the next step in the continuing effort to shift a starting time from Program A to Program B. These options are (1) to press the ON/OFF key, (2) to press the HOURS key or (3) to press the MINUTES key.

Assume that the ON/OFF key is depressed whereby the processor proceeds through block 102 to a decision block 126. If the system was not in the start key mode, the processor would proceed to circle 128 and continue with other aspects of the overall program of system 10 not associated with the flow chart of FIG. 3. However, in this instance, the system has been set in the start key mode, as described above, and the processor proceeds to block 130 where the question is whether the ON/OFF key was the last depressed key. Since it was, the processor moves to block 132 where the question is whether a start time is currently being displayed. In this instance, "OFF" is being displayed and the processor progresses to block 134 which initiates a search for the first unused start time, that is a start time in the "OFF" mode.

If a start time had been displayed with respect to block 132, the processor would have proceeded to block 136 to turn off the start time and thereby place it in the "OFF" mode making it available for subsequent assignment. In this instance, the program would have instructed through block 122 that "OFF" be displayed. The operator-user could then press the ON/OFF key and proceed through to block 134 as described above.

Returning now to the search for the first unused start time in block 134, the processor advances to block 138 and asks whether an unused start time had been found. If not, "OFF" is displayed through block 122. In this instance, the above-noted unassigned start time having just been shifted from an assignment to Program A to the unassigned category is available and the processor proceeds to block 140 to turn on the start time. The processor now advances to block 142 where the start time being processed is assigned to the program of the last START key which was depressed, namely, the START B key. Thus, a start time which was previously assigned to Program A has now been shifted to Program B.

The processor now progresses from block 142 to block 118 to display the start time and its assigned program i.e. Program B. It is noted that the display shows the hours and P or A for PM or AM, respectively, as they appeared when last assigned to Program A but show the minutes as ":00" and also shows "B" to indicate assignment to Program B. The operator-user must now use the HOURS key and the MINUTES key to input the data to provide the desired starting time under Program B.

It is noted that a start time slot could have been "OFF" at the time the operator-user was searching for a start time to shift into Program B. In this instance, the "OFF" start time slot could be used to facilitate assignment of a start time to Program B rather than selecting and shifting a start time from Program A. If this procedure is selected, the operator-user would follow the above-described procedure which would be initiated by depressing the START B key and thereafter selecting the ON/OFF key option as described above or the HOURS or MINUTES key options as described below.

Other user-friendly options are provided, as noted above, whereby the operator-user could have pressed the HOURS key or the MINUTES key to initiate the effort to assign the available start time to Program B instead of pressing the ON/OFF key. After the START B key has been depressed as noted above and the display is in the "OFF" mode, the HOURS key or the MINUTES key may be depressed whereby the processor proceeds through blocks 102, 126 and 130 and to block 144 where a question is asked as to whether an HOURS or a MINUTES key was depressed. If either was not depressed, the processor exists at this point and proceeds to circle 128 to continue other functions of the overall program of system 10 unrelated to the flow chart of FIG. 3. In this instance, either the HOURS key or the MINUTES key was depressed and the processor proceeds to block 146 where a question is asked whether a start time is being displayed at that instant. If a start time is being displayed, the processor proceeds to block 148.

If a start time is not being displayed, which is the case in this example, the processor proceeds to block 150 to initiate a search for the first unused start time and to block 152 to ask whether an unused start time was found. If it was not found, the processor proceeds to block 154 to continue to display "OFF" and then to circle 128 to proceed with other functions of the overall program of system 10 unrelated to the flow chart of FIG. 3.

If an unused start time is found, the processor proceeds from block 152 to block 148. In either instance where the processor proceeds from block 146 or block 152 to block 148, the start time being displayed or found is set to the last start key pressed which is START B key. The processor then proceeds to block 156 where the question is asked as to whether the start time is "OFF." In this instance it is and the processor proceeds to block 158 where the start time is turned on and then advances to block 118 to display the start time. Again, the display includes indication that the starting time is in Program B but the hours and AM or PM data is displayed as it appeared previously before being shifted from Program A to Program B.

If a start time had been displayed at the time of decision block 146, the processor will proceed from block 156 to block 160. At block 160, either the hours or the minutes of the display will be incremented. The processor then proceeds to block 118 to display the start time as noted above. The HOURS and MINUTES KEYS are then used to select the desired time, again as noted above.

Thus, with the system as presented with respect to the flow chart of FIG. 3, a systems user can segregate use thereof into two categories, i.e. a program for watering grass (e.g. under Program A) and a program for watering shrubs (e.g. under Program B). If new grass seed is planted in certain areas, it is important to water this area more frequently each day. Therefore, all six starting times would be assigned to the watering of grass under Program A. As the grass begins to grow and form roots, it is important that the watering occur for longer periods but less frequently thereby allowing the water to go deeper into the ground to water the roots. In this instance, one or two of the start times can be shifted to program B to water the shrubs which is typically not done every day but at interval days during the week. Eventually, the watering schedules under Program A and Program B can be balanced whereby the operator-user can shift the start times easily as described above from one program to the other to effectuate a well managed irrigation process.

Regarding the electronic circuit breaker, and as noted above, the pulse width of the output of comparator 84 is determined by the amplitude of the current of the positive half cycle of each cycle of the AC input to the low voltage power source 32. The level of current and the duration that the waveform remains above a set level is established by the voltage drop across current sensing resistor 78. When an overcurrent or excessive current occurs during a positive half cycle of the AC input, the pulse width of the output of comparator 84 increases. This increase is detected by microprocessor 42 resulting in analysis of the current draw condition and termination of the watering of one or all zones.

Figure 4:
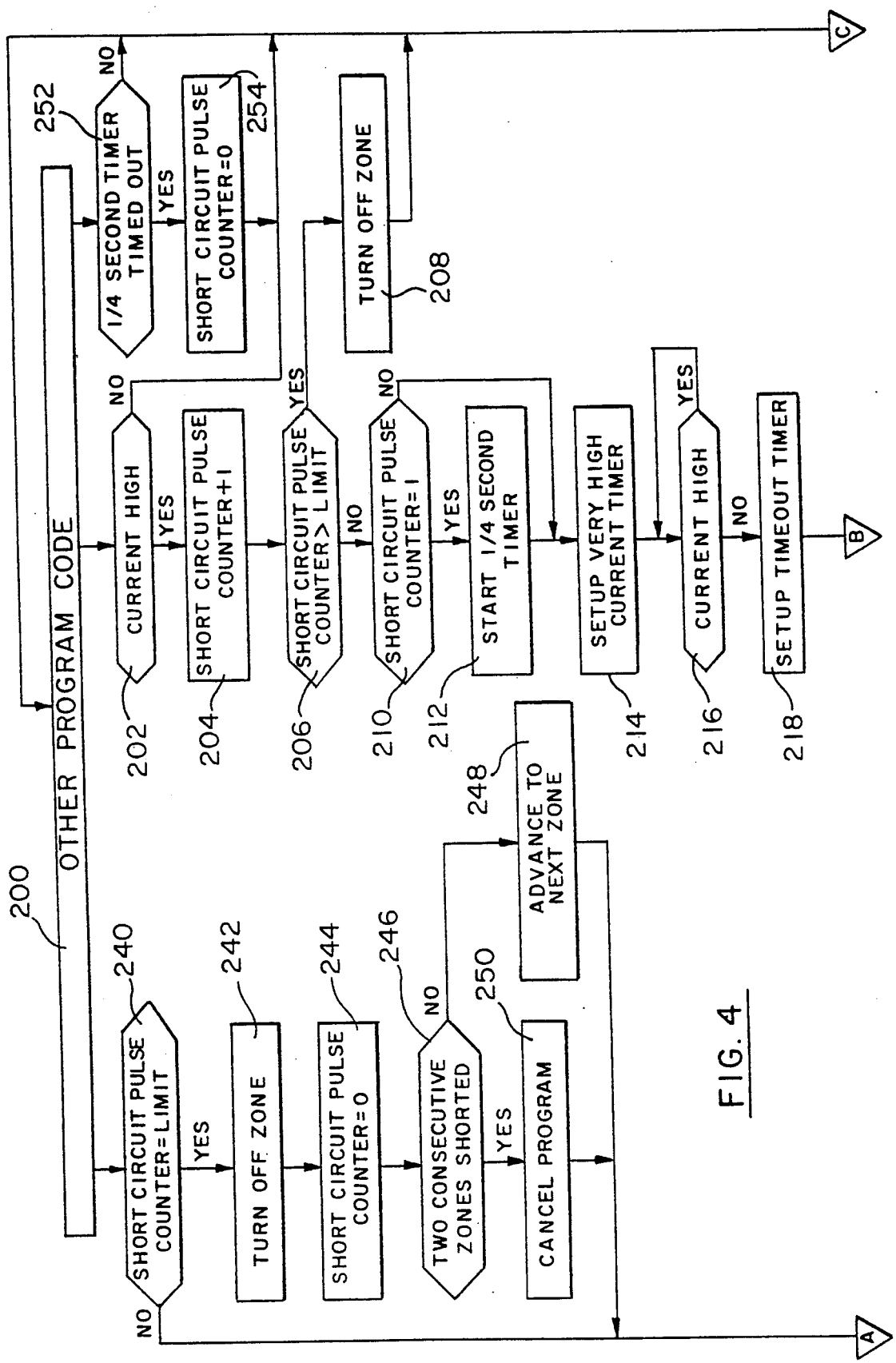
FIGS. 4 and 5 when combined at the A-B-C triangles reveal a flow chart illustrating in accordance with certain principles of the invention the manner of monitoring the current through a power supply of the system of FIG. 1 to determine when an overload occurs which results in excessive current being drawn from the supply and for thereafter shutting down the particular zone of FIG. 1 in operation at the time of detecting the overload.
Figure 5:
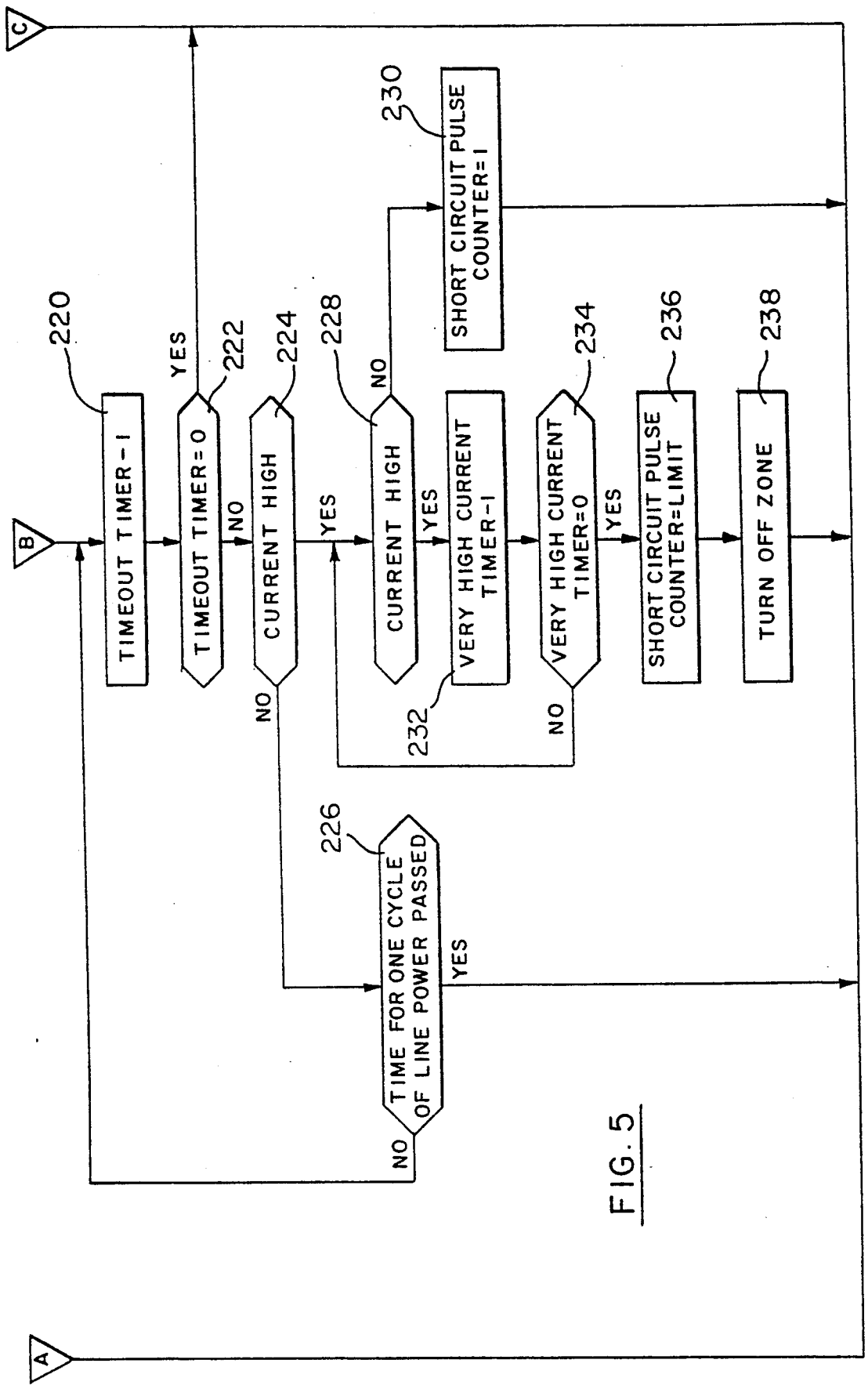

Referring to FIGS. 4 and 5, a flow chart illustrates the processing of the current draw condition for the active zone being watered through operation of the program within microprocessor 42. Start-up conditions are also monitored where the initial current draw for solenoid operation is high but then reduces to a low operating level within an acceptable level range. Block 200 represents the features and functions of the overall program of system 10 other than those associated with the circuit breaker features of the flow chart of FIGS. 4 and 5. Initially, the pulse width of the output of comparator 84 is analyzed in block 202 to determine whether the current draw for the currently operated valve, or valves, and its respective triac is high. If it is not high or excessive, the processor returns to block 200. If the current is high, the processor proceeds to block 204 where a short circuit pulse counter is incremented by one count. The short circuit pulse counter accumulates the count for the number of positive half cycles of AC input during which occur overcurrent or excessive conditions during a prescribed period to be described later.

The processor then advances to block 206 where the question is asked as to whether the count of the short circuit pulse counter is equal to or greater than a prescribed limit set by the program to represent an unsafe number of occurrences. In this example, the number set by the program is ten. If the last incremented count in block 204 reached ten, the processor would proceed to block 208 to turn off the zone being monitored whereafter the processor returns to block 200 to continue other functions. The program then moves immediately to the next watering zone to initiate the watering cycle for that zone.

If the short circuit pulse counter is not equal to or has not exceeded the limit in block 206, the processor proceeds to block 210 which asks whether the short circuit pulse counter equals one. In this instance it does and the processor proceeds to block 212 which starts a one-quarter second timer. This timer establishes a window within which the short circuit pulses must occur for a given zone before the breaker is reset. It has been determined that to count short circuit pulses beyond one-quarter second would not be representative of a condition warranting the turn off of a zone.

If block 210 indicates that the short circuit pulse counter is not equal to one, the processor proceeds to bypass block 212.

In the instance of the "no" response of block 210 or the direct path from block 212, the processor proceeds to block 214 which sets up a very high current timer which functions in a later part of the circuit breaker program. The very high current timer is, in effect, a counter into which a number is inserted to represent an acceptable limit of the pulse width being monitored. The inserted count represents a time of about 5 milliseconds for a 60 Hertz input and slightly longer for a 50 Hertz input. When the current exceeds this time limit of 5 milliseconds, the current is considered to have reached an unacceptable level as will be noted later.

The processor then proceeds from block 214 to block 216 where a question is asked as to whether the current is high. If it is, the processor loops around and returns to block 216 to ask the same question. This pattern is repeated as long as the current of the positive half cycle is high and could continue until the half cycle approaches zero crossover at the trailing portion of the half cycle. When this condition occurs, the current is no longer high and the processor advances to block 218 to set up a timeout timer with a count representing about 22 milliseconds which is above the time for one full cycle of the 60 Hertz source as well as a 50 Hertz source. The timeout timer is decremented in a later portion of the circuit breaker program to provide a safety valve exit from the circuit breaker program if the current decreases to an acceptable level.

The processor then proceeds to block 220 which decrements the timeout timer by one count each time the processor processes through block 220. The processor proceeds to block 222 where a question is asked whether the timeout timer is equal to zero. In other words, has the 22 milliseconds period of the timeout timer transpired. If the answer is no, the processor proceeds to block 224 which determines whether the current is high. If the current is not high, the processor proceeds to block 226 where a question is asked as to whether time for one cycle of line power (i.e. 60 Hertz or 50 Hertz) has passed. If it has, the circuit breaker program of the flow chart of FIGS. 4 and 5 is exited and returns to the program codes of block 200. If the measured time has not passed in block 226, the processor loops around to block 220 where the timeout timer is decremented by one count. This pattern continues as long as the current is not high as determined by block 224 until the timeout timer equals zero. At that time, the circuit breaker program of FIGS. 4 and 5 is exited and returns to other program codes of block 200.

If a high current condition is detected in block 224 at any time while the processor is moving through the timeout timer loop, the processor leaves the loop and proceeds to block 228. If a high current condition is determined in block 228, the processor advances to block 232 where the very high current timer is decremented by one count. As noted above, the very high current timer has been set to a count representing a time of about 5 milliseconds. This time period establishes the upper limit of an acceptable pulse width of an overcurrent condition. The processor then advances from block 232 to block 234 where a question is asked as to whether the very high current time equals zero which indicates that the pulse width is at least equal to 5 milliseconds and has reached an unacceptable level. If the timer of block 234 has not been decremented to zero, the processor loops around to block 228 where the current is again examined to determine whether it is high.

If the current is not high in block 228, the processor moves to block 230 and increments the short circuit pulse counter by one count to reflect that another high current had been detected in block 224. The processor then proceeds to block 200 for the program codes and thereby exits the circuit breaker program.

If the current remains high and the very high current timer is decremented to zero as determined in block 234, the processor proceeds to block 236 where the short circuit pulse counter is automatically set to a higher count representing an unacceptable limit beyond which the zone being monitored cannot operate safely. The higher count to which the short circuit pulse counter is set represents a number of overcurrent pulses, for example ten positive half cycles of AC input current each of which are excessive. The processor then moves to block 238 to turn off the troubled zone and then exits the circuit breaker program and returns to block 200 and the other program codes.

As shown in FIG. 4, another portion of the circuit breaker program is constantly monitoring in block 240 the short circuit pulse counter to determine whether the counter is equal to or greater than the set limit. If it is not, the circuit breaker program is exited and the processor returns to other program codes in block 200. If the counter is equal to or greater than the limit, the processor moves to block 242 to turn off the troubled zone. This is redundant, in a sense, because this function has been accomplished previously in either block 208 or block 238 but provides assurance of shut down of the troubled zone. The processor advances to block 244 where the short circuit pulse counter is reset to equal zero. This prepares the counter for monitoring of the next zone.

The processor then proceeds to block 246 where a determination is made as to whether the most recent short circuit detection and shutdown represents the second of two consecutive zones shorted. If it is not, the processor advances to block 248 to advance to the next zone to initiate watering within that zone in accordance with the existing programmed schedule. If it is determined in block 246 that there has been two consecutive zones shorted, the processor advances to block 250 where the entire program is cancelled.

Earlier in the circuit breaker program at block 212, a one-quarter second timer had been started. In block 252, the timer is constantly monitored to determined whether it has timed out. If not, the processor exits the circuit breaker program and returns to block 200 and the other program codes. If the timer has timed out, the processor advances to block 254 and resets the short circuit pulse counter to zero and then exits the circuit breaker program to block 200.

As described above, irrigation system 10 provides a multiple program controlled system which operates with two separate and distinct program, i.e. Program A and Program B. Each program is capable of accepting a total of six starting times for each of a plurality of zones which may be watered under each program to establish the times at which watering cycles begin within each zone. Microprocessor 42 provides a total of six start times for system 10. Under the process described in the flow chart of FIG. 3, system 10 provides facility for assigning up to six start times to either program and for shifting one or more start times from one program to the other. This provides versatility in a watering system wherein the operator-user can easily shift the starting times between watering grass and watering shrubs as specific needs arise.

Also as described above, irrigation system 10 provides a program controlled system which includes an electronic circuit breaker for monitoring the current drawn by the valve control units of each zone. The current is monitored on the basis of each positive half cycle of an AC input to the low D.C. voltage power source 32 and determines the length of time that each positive half cycle exceeds a current level. The zone being monitored is not shut down in response to detection of brief or limited overcurrent situations. Instead, the number of overcurrent and limited overcurrent occurrences are determined and if a preset number is reached within a prescribed period, then the zone is shutdown. Also, if very high or excessive current conditions occur at any time during monitoring, the troubled zone is shutdown. Further, if two consecutive zones are shutdown, system 10 is then shutdown.

In general, the above described embodiments are not to be construed as limiting the breadth of the present inventions. Modifications, and other alternative constructions will be apparent which are within the spirit and scope of the invention as defined in the appended claims.

APPENDIX

Application for U.S. Patent

Applicant: Laurence R. Nicholson
Title: Program Controlled Irrigation System
Attorney: J. Bruce Hoofnagle (Reg. No. 20,973)
Attorney Doc. No.: 4343-27

©  1990 GardenAmerica Corporation

```
;PROGRAM DESCRIPTION:
;
;THIS PROGRAM IS CUSTOM CODE FOR A COP445L MICRO-CONTROLLER CHIP.
;IT OPERATES TWO INDEPENDENT PROGRAMS, EACH PROGRAMMED WITH DAYS
;TO WATER, START TIMES, AND WATER TIME PER ZONE. 4, 6, AND 8 ZONE
;VERSIONS ARE SUPPORTED.
;
;LOGIC IS PROVIDED FOR A "SMART" CIRCUIT BREAKER
;IN PLACE OF A HARDWARE CIRCUIT BREAKER. TWO CURRENT LEVELS ARE
;RECOGNIZED BY SOFTWARE PULSE MEASUREMENT FOR A FAST OR SLOW FUSE EFFECT.
;
;RAM IS VALIDATED WITH BOTH A CHECKSUM OF CERTAIN VALUES AND BY A RAM
; COPY OF ZONE TIMES. FULL RESET ONLY OCCURS IF INVALID.
;
;THE PROGRAM CONTROLS AN ATTACHED CUSTOM LCD DISPLAY, 9 TRIAC GATES
;TO TURN VALVES ON & OFF, AND 12 PUSHBUTTONS FOR PROGRAMMING.
;
;SPECIFICATIONS:
;
;       NUMBER OF PROGRAMS:      2
;       NUMBER OF START TIMES:   6 (ASSIGNABLE TO EITHER PROGRAM)
;       NUMBER OF ZONES:         8
;       MAX WATER TIME SETTING:  99 MINUTES
;       CLOCK:                   7 DAYS
;       TIMEBASE                 50/60 HZ, HARDWIRE SELECTED
;
        .CHIP   444
;
;OPTIONS
;
;       OPT 01  =0
;       OPT 02  =3      ;CKO IS HI-Z INPUT
;       OPT 03  =3      ;CKI IS DIVIDE BY 4 R-C CLOCK INPUT
;       OPT 04  =1      ;RESET IS HI-Z
;       OPT 05  =3      ;L7 PUSH PULL OUTPUT
;       OPT 06  =0      ;L6 STD OUTPUT
;       OPT 07  =0      ;L5
;       OPT 08  =0      ;L4
;       OPT 09  =0      ;IN1- NO OPTION
;       OPT 10  =0      ;IN2
;       OPT 11  =0      ;4.5-6.3 VOLT OPERATION
;       OPT 12  =0      ;L3 STD OUTPUT
;       OPT 13  =0      ;L2
;       OPT 14  =0      ;L1
;       OPT 15  =0      ;L0
;       OPT 16  =0      ;SI HAS PULL UP
;       OPT 17  =2      ;SO PUSH-PULL OUTPUT
;       OPT 18  =2      ;SK PUSH-PULL OUTPUT
;       OPT 19  =0      ;IN0-NO OPTION
;       OPT 20  =0      ;IN3
;       OPT 21  =0      ;G0- VERY HIGH CURRENT STD OUTPUT
;       OPT 22  =0      ;G1-  "         "        "     "
;       OPT 23  =4      ;G2 STD OUTPUT
;       OPT 24  =0      ;G3 VERY HIGH CURRENT STD OUTPUT
;       OPT 25  =0      ;D3 VERY HIGH CURRENT STD OUTPUT
;       OPT 26  =0      ;D2
;       OPT 27  =0      ;D1-
;       OPT 28  =0      ;D0-
;       OPT 29  =1      ;L INPUTS HAVE HIGH TRIP LEVEL
;       OPT 30  =0      ;I INPUTS- NO OPTION
;       OPT 31  =0      ;G INPUTS- DON'T CARE
;       OPT 32  =0      ;SI INPUT- TTL LEVELS
```

```
;       OPT 33  =0      ;RESET IS SCHMITT TRIG INPUT
;       OPT 34  =1      ;CKO INPUT- HIGH TRIP POINT
;       OPT 35  =1      ;COP445L BONDING (24 PIN PACKAGE)
;       OPT 36  =1      ;NO INTERNAL RESET
        PAGE
        SBTTL 'RAM MAP'
;
;RAM MAP
;
;DIGT    0       1       2       3       4       5       6       7
;------------------------------------------------------------------------
; F     ZN8H    WKDAY   TMPTIM  KEYFLG                                  ZX8H
;------------------------------------------------------------------------
; E     ZN8L    CKHRSH  TEMP4   KEYTMR                                  ZX8L
;------------------------------------------------------------------------
; D     ZN7H    CKHRSL  TEMP3   WTRFLG  DAYSBH  WKDYBH                  ZX7H
;------------------------------------------------------------------------
; C     ZN7L    CKMINH  TEMP2   OPTION  DAYSBL  WKDYBL                  ZX7L
;------------------------------------------------------------------------
; B     ZN6H    CKMINL  TEMP1   ZNFLGH  DAYSAH  WKDYAH                  ZX6H
;------------------------------------------------------------------------
; A     ZN6L    CKDIVH  SHTCNT  ZNFLGL  DAYSAL  WKDYAL  DSPPTR          ZX6L
;------------------------------------------------------------------------
; 9     ZN5H    CKDIVL  PRESCL  WTIMH                                   ZX5H
;------------------------------------------------------------------------
; 8     ZN5L    PCNTH   PVALH   WTIML                                   ZX5L
;------------------------------------------------------------------------
; 7     ZN4H    PCNTL   PVALL   WDIVH                                   ZX4H
;------------------------------------------------------------------------
; 6     ZN4L    ST2HRH  ST4HRH  ST6HRH  CHKSUM  CHKTMP                  ZX4L
;------------------------------------------------------------------------
; 5     ZN3H    ST2HRL  ST4HRL  ST6HRL  TMPCNT                          ZX3H
;------------------------------------------------------------------------
; 4     ZN3L    ST2MIN  ST4MIN  ST6MIN  SFLAG                           ZX3L
;------------------------------------------------------------------------
; 3     ZN2H    ST1HRH  ST3HRH  ST5HRH  CLKFLG                          ZX2H
;------------------------------------------------------------------------
; 2     ZN2L    ST1HRL  ST3HRL  ST5HRL  SWNDOW                          ZX2L
;------------------------------------------------------------------------
; 1     ZN1H    ST1MIN  ST3MIN  ST5MIN  GPORT                           ZX1H
;------------------------------------------------------------------------
; 0     ZN1L    DSPNUM  MODE    PWRFLG  OUTNUM  FLAGI   DSPIMG          ZX1L
;------------------------------------------------------------------------

PAGE
        SBTTL 'RAM DEFINITIONS'
;
;REGISTER 0
;
ZN1L    EQU     00H     ;ZONE 1 TIME (BCD)
ZN1H    EQU     01H
ZN2L    EQU     02H     ;ZONE 2
ZN2H    EQU     03H
ZN3L    EQU     04H     ;ZONE 3
ZN3H    EQU     05H
ZN4L    EQU     06H     ;ZONE 4
ZN4H    EQU     07H
ZN5L    EQU     08H     ;ZONE 5
ZN5H    EQU     09H
ZN6L    EQU     0AH     ;ZONE 6
ZN6H    EQU     0BH
ZN7L    EQU     0CH     ;ZONE 7
```

```
ZN7H      EQU     0DH
ZN8L      EQU     0EH     ;ZONE 8
ZN8H      EQU     0FH
;
;REGISTER 1
;
DSPNUM    EQU     010H    ;DISPLAY NUMBER
                          ; START MODE- 0-5 ST #, 6= END
                          ; PGM WEEK DAY- 0-6 DAY, 7 = INTERVAL FLIP
                          ; PGM INTVL DAY- 0 = SETTING, 1 = COUNT, 2 = WKDAY FLIP
                          ; ZONE MODE, AUTO WATERING: 0-7 ZONE #
                          ; MANUAL MODES: ZONE #
                          ; TIME, DAY, RAIN- DON'T CARE
ST1MIN    EQU     011H    ;START TIME 1 MINUTES CODE (0-B = 0 TO 55 MINUTES
                          ;   C = START TIME OFF)
ST1HRL    EQU     012H    ;START TIME 1 HOURS LSD
ST1HRH    EQU     013H    ;START TIME 1 HOURS MSD
                          ; D0- HRS MSD
                          ; D1- 0 = AM, 1 = PM
                          ; D2- 0 = PGM A, 1 = PGM B
                          ; D3- 1 = PENDING (START TIME IS STACKED FOR PENDING
                          ;                  WATER CYCLE)
ST2MIN    EQU     014H    ;START TIME 2 MINUTES CODE (0-B = 0 TO 55 MINUTES
                          ;   C = START TIME OFF)
ST2HRL    EQU     015H    ;START TIME 2 HOURS LSD
ST2HRH    EQU     016H    ;START TIME 2 HOURS MSD
;
PCNTL     EQU     017H    ;POWER FAIL TIME BASE COUNTER **** HERE REL. TO PVAL
PCNTH     EQU     018H    ; COUNTS HARDWARE TIMER TO 4 SECOND INTERVAL
;
CKDIVL    EQU     019H    ;1/4 SECOND TO 4 SECOND PRESCALER
CKDIVH    EQU     01AH    ;4 SECOND TO 1 MINUTE PRESCALER
CKMINL    EQU     01BH    ;CLOCK TIME MINUTES
CKMINH    EQU     01CH
CKHRSL    EQU     01DH    ;CLOCK HOURS
CKHRSH    EQU     01EH    ;D0- CLOCK MSD
                          ;D1- CLOCK AM/PM (1 = PM)
                          ;D2-
                          ;D3-
WKDAY     EQU     01FH    ;D0-D2- WEEK DAY (0 - 6)
;
;REGISTER 2
;
MODE      EQU     020H    ;DISPLAY/ OPERATION MODE
                          ; 0- PGM START A
                          ; 1- PGM START B
                          ; 2- PGM DAYS A
                          ; 3- PGM DAYS B
                          ; 4- ZONES A (PROGRAMMING OR AUTO WATERING)
                          ; 5- ZONES B
                          ; 6- MANUAL PGM A   (PROGRAMMING OR MANUAL WATERING)
                          ; 7- MANUAL PGM B
                          ; 8- MANUAL SINGLE ZONE
                          ; 9- MANUAL A & B
                          ; A- CLOCK TIME
                          ; B- CLOCK DAY
                          ; C- RAIN
                          ; D-F NOT USED
ST3MIN    EQU     021H    ;START TIME 3 MINUTES CODE (0-B = 0 TO 55 MINUTES
                          ;   C = START TIME OFF)
ST3HRL    EQU     022H    ;START TIME 3 HOURS LSD
ST3HRH    EQU     023H    ;START TIME 3 HOURS MSD
```

```
ST4MIN   EQU   024H    ;START TIME 4 MINUTES CODE (0-B = 0 TO 55 MINUTES
                       ;   C = START TIME OFF)
ST4HRL   EQU   025H    ;START TIME 4 HOURS LSD
ST4HRH   EQU   026H    ;START TIME 4 HOURS MSD
PVALL    EQU   027H    ;POWER FAIL TIMEBASE CALIBRATION VALUE-
PVALH    EQU   028H    ; VALUE ADJUSTED TO EQUAL TIMER TO 4 SECOND DIVIDE
                       ; **** PVAL PLACED IN RAM RELATIVE TO PCNT *******
PRESCL   EQU   029H    ;LINE FREQ. INPUT TO 1/4 SECOND PRESCALER
SHTCNT   EQU   02AH    ;SHORT CIRCUIT COUNTER (ELECTRONIC FUSE)
TEMP1    EQU   02BH    ;TEMP CELLS
TEMP2    EQU   02CH    ;
TEMP3    EQU   02DH    ;
TEMP4    EQU   02EH    ;TEMP4 USED IN CHKTRN.
TMPTIM   EQU   02FH    ;TEMP TIMER USED IN CHKTRN TO MEASURE SHORT CIR. PLS
;
;REGISTER 3
;
PWRFLG   EQU   030H    ;POWER FLAG
                       ;D0- 50HZ FLIP FLAG (DIVIDE BY 12 OR 13 FOR 1/4 SEC)
                       ;D1- LINE FREQ INPUT POLARITY
                       ;D2- POWER FAIL- 1= POWER FAIL
                       ;D3- FUSE FLAG- 1= SHORT CIRCUIT HAS OCCURRED
ST5MIN   EQU   031H    ;START TIME 5 MINUTES CODE (0-B = 0 TO 55 MINUTES
                       ;   C = START TIME OFF)
ST5HRL   EQU   032H    ;START TIME 5 HOURS LSD
ST5HRH   EQU   033H    ;START TIME 5 HOURS MSD
ST6MIN   EQU   034H    ;START TIME 6 MINUTES CODE (0-B = 0 TO 55 MINUTES
                       ;   C = START TIME OFF)
ST6HRL   EQU   035H    ;START TIME 6 HOURS LSD
ST6HRH   EQU   036H    ;START TIME 6 HOURS MSD
WDIVH    EQU   037H    ;WATER TIMER PRESCALER- 4 SECONDS TO 1 MINUTE
WTIML    EQU   038H    ;WATER TIMER (0 TO 99 MINUTES BCD)
WTIMH    EQU   039H
ZNFLGL   EQU   03AH    ;ZONE PROGRAM FLAGS- 0 = PGM A, 1 = PGM B
                       ; D0- ZONE 1, D1- ZONE 2, D2- ZONE 3, D3- ZONE 4
ZNFLGH   EQU   03BH    ; D0- ZONE 5, D1- ZONE 6, D2- ZONE 7, D3- ZONE 8
OPTION   EQU   03CH    ;RAM COPY OF OPTION JUMPERS (UPDATED WITH DISPLAY)
                       ;D0- 0=50HZ, 1=60 HZ OPERATION
                       ;D1- 0 = 6 ZONE CONTROLLER
                       ;D2- 0 = 8 ZONE CONTROLLER
                       ;D3- 0 = TEST MODE (UNDEFINED)
WTRFLG   EQU   03DH    ;WATERING FLAGS
                       ;D0- 1 = CONTROLLER HAS BEEN PROGRAMMED
                       ;      0 = CONTROLLER HAS BEEN RESET
                       ;D1- 1/4 SECOND DISPLAY UPDATE FLAG
                       ;D2- PAUSE (1)
                       ;D3- WATER ENABLE (1)
KEYTMR   EQU   03EH    ;KEY BOARD LOCKOUT TIMER (ENABLE SETTING OF VALUES)
KEYFLG   EQU   03FH    ;KEYBOARD FLAGS- ***** POSITION WITH KEYTMR *********
                       ;D0- DEBOUNCE FLAG
                       ;D1- 4 SECOND INTERVAL FOR CLOCK
                       ;D2 & D3- SET TIMER (1/4 SECOND TO 3/4 SECOND)
;
;REGISTER 4
;
OUTNUM   EQU   040H    ;OUTPUT ZONE NUMBER- RAM COPY OF OUTPUT PORT
                       ; NEVER DIRECTLY PROCESSED- OUTPUT FROM DSPNUM
GPORT    EQU   041H    ;RAM COPY OF G PORT VALUE
SWNDOW   EQU   042H    ;SHORT CIRCUIT WINDOW TIMER (1/4 SEC. STEPS)
CLKFLG   EQU   043H    ;CHKTRN SPECIAL FLAG
                       ;D0-D2- NOT USED
                       ;D3- 1 IF EXTRA CLOCK TICK HAS ELAPSED AFTER MEASURING
                       ;    PULSE WIDTH OF SHORT CIRCUIT PULSE.
```

```
SFLAG    EQU    044H     ;BIT 3 IS FLAG- SHORT HAS OCCURRED IN WATER CYCLE
TMPCNT   EQU    045H     ;COUNTER USED FOR TIMEOUT IN SHORT INPUT
CHKSUM   EQU    046H     ;4 NIBBLE CHECKSUM FOR CLOCK, STARTS, ZONE FLAGS, &
                         ; DAYS
DAYSAL   EQU    04AH     ;PGM A DAYS- INTRVL MODE COUNT
DAYSAH   EQU    04BH     ;        INTRVL MODE SETTING
                         ;   D3- 0 = INTERVAL MODE, 1 = WEEK DAY MODE
DAYSBL   EQU    04CH     ;PGM B DAYS- SEE DAYSA ABOVE
DAYSBH   EQU    04DH
;
;
;REGISTER 5
;
FLAGI    EQU    050H     ;D3 SET AFTER PVAL IS INITIALIZED AFTER FIRST 4 SECONDS
CHKTMP   EQU    056H     ;4 NIBBLE CHECKSUM TEMP CELLS
WKDYAL   EQU    05AH     ;PGM A WEEK DAYS, DAYS 1-4 1=ON.
WKDYAH   EQU    05BH     ;PGM A WEEK DAYS, DAYS 5-7 1=ON.
WKDYBL   EQU    05CH     ;PGM B WEEK DAYS, DAYS 1-4 1=ON.
WKDYBH   EQU    05DH     ;PGM B WEEK DAYS, DAYS 5-7 1=ON.
;
;REGISTER 6
;
DSPIMG   EQU    060H     ;10 NIBBLES OF DISPLAY IMAGE- FOR FASTER SERIAL OUT
DSPPTR   EQU    06AH     ;DSPIMG POINTER- USED ONLY IN DISPLAY.
;
;REGISTER 7
;
ZX1L     EQU    070H     ;RAM COPY OF ZONE TIMES FOR RAM VALIDITY CHECK
                         ; (DUE TO EXTRA RAM, USES ALL 16 NIBBLES OF REG. 7)
         PAGE
         SBTTL  'CONSTANTS'
;
DIVL     EQU    0H       ;MINUTE DIVIDER VALUE (DIVIDE BY 240) (250 MS PRESCALE)
DIVH     EQU    1H       ; (TWO'S COMPLEMNT VALUES)
SHFMOD   EQU    1100B    ;SHIFT REG MODE, L DRIVERS ENABLED- DISPLAY LOAD ONLY
CNTMOD   EQU    0101B    ;COUNTS SHORT CIRCUIT PULSES,
                         ; WITH L PORT ENABLED.
PFTIML   EQU    00H      ;POWER FAIL TIMER DEFAULT VALUE
PFTIMH   EQU    08H      ; 27 US SLOW CLOCK X 1024 =>> TIMER =>> PVAL =>> 4 SEC.
                         ; SET LOW SO FAST FUSE WILL TRIGGER PROPERLY IN
                         ; FIRST 4 SECONDS.
KEYVAL   EQU    00       ;KEY LOCK OUT TIME VALUE- COUNT UP TO 8 IN 4 SEC. STEPS
WINDOW   EQU    0CH      ;SHORT INPUT WINDOW TIME- 1/4 SEC. COUNT UP VALUE
SHTLIM   EQU    08H      ;NUMBER OF SHORT COUNTS (-1) REQ'D TO TRIP CIR. BREAKER
         PAGE
         SBTTL  'RESET ROUTINE'
;
;EXECUTION STARTS HERE ON POWER UP
;
         ORG    00H
;
RESET:   CLRA
         JSR    OUTOFF   ;TURN OFF TRIACS AS SOON AS POSSIBLE
         LEI    CNTMOD   ;ENABLE L DRIVERS
         LBI    ZN1L
RES15:   LD     0        ;CHECK VALIDITY OF RAM
         XAD    TEMP1
         XABR
         AISC   07
         XABR
         XAD    TEMP1
         SKE
         JP     RES0     ;ERROR- RESET ENTIRE CONTROLLER (COLD START)
```

```
        CLRA
        XABR
        LD      0
        XIS     0
        JP      RES15   ;LOOP
        LBI     CHKSUM  ;MOVE CHECKSUM TO TEMP
RES19:  LD      01
        XIS     01
        CBA
        AISC    06H
        JP      RES19
        JSR     CALSUM  ;CALCULATE CHECKSUM
        LBI     CHKSUM
RES18:  LD      01
        SKE
        JP      RES0    ;ERROR
        XIS     01
        CBA
        AISC    06H
        JP      RES18
        JSRP    WTROFF  ;RAM ASSUMED TO BE VALID- START NORMAL PROGRAM
;
RES0:   LBI     010H    ;SKIP INITIALIZING ZONE TIMES IN CASE RESET GLITCHES
        JP      RES4
RES1:   XABR
RES4:   CLRA
        XIS     0
        JP      RES4
        XABR
        AISC    09      ;CLEAR RAM
        JP      RES1
        LBI     DAYSAL  ;SET DAYS MODES TO WEEK DAYS, EVERY DAY
        STII    0
        STII    08
        STII    0
        STII    08
        LBI     WKDYAL
        STII    0FH
        STII    07
        STII    0       ;PGM B, ALL DAYS OFF
        STII    0
        JMP     RES2
        PAGE
        SBTTL   'CONVERSION TABLE'
;
        IF      ($ GT 0040H)
        JP      ADRERR            ;SEG TABLE ADDRESS OVER 030 HEX
        ENDIF
        ORG     040H
;
;BCD TO 7 SEGMENT CONVERSION TABLE- FOR NORMAL 7 SEGMENT DIGITS
;
SEGTL1: DB      0F3H    ;0- ALSO "O" IN "OFF" AND "ON"
        DB      060H    ;1
        DB      0D6H    ;2
        DB      0F4H    ;3
        DB      065H    ;4
        DB      0B5H    ;5- ALSO "S" IN "FUSE"
        DB      0B7H    ;6
        DB      0E0H    ;7
        DB      0F7H    ;8
        DB      0F5H    ;9
LETRU   EQU     0AH
```

```
          DB      073H    ;"U" IN "FUSE"
LETRD     EQU     0BH
          DB      076H    ;"d" (LOWER CASE FOR DAY)
LETRF     EQU     0CH
          DB      087H    ;"F" IN "OFF" AND "FUSE"
LETRP     EQU     0DH
          DB      0C7H    ;"P" IN "PSE"
LTRBLK    EQU     0EH
          DB      00      ;BLANK (ALLOWS BLANK WITH ICON LIT)
LETRN     EQU     0FH
          DB      026H    ;"N" LOWER CASE
;
;4TH DIGIT SEGMENT COMBINATIONS
;
          ORG     050H
;
SEGTL2:   DB      04BH    ;MSD = 0, AM
          DB      05BH    ;MSD = 1, AM
          DB      049H    ;MSD = 0, PM
          DB      059H    ;MSD = 1, PM
LETR2F    EQU     04
          DB      048H    ;"F"
LETR2E    EQU     05
          DB      068H    ;"E"
LTR2FW    EQU     06
          DB      0CCH    ;"F" + WEEK DAY
LTR2NW    EQU     07
          DB      0C6H    ;"n" + WEEK DAY
LTR2WD    EQU     08
          DB      084H    ;WEEK DAY
LTR2D     EQU     09
          DB      080H    ;DAY
LTR2FD    EQU     0AH
          DB      0C8H    ;"F + DAY"
          PAGE
          SBTTL   'DISPLAY OUTPUT'
;
;OUTPUT ONE DISPLAY DIGIT ACCORDING TO VALUE IN RAM OR ACCUM.
;IF CARRY IS SET ON ENTRY, TURN ON ICON IN DIGIT
;ALWAYS EXITS WITH CARRY CLEAR
;
;26 CYCLES TYPICAL NOT INCLUDING CHKTRN.
;
DSOUT:    LBI     TEMP1   ;SAVE IN TEMP1
          X       0
          CLRA
          AISC    ((SEGTL1 AND 0F0H) / 010H)
DS22:     LQID            ;GET SEGMENT PATTERN
          LBI     DSPIMG
          LDD     DSPPTR  ;POINT TO RAM IMAGE AREA
          CAB
          COMA
          SKC             ;IF CARRY IS SET, SET BIT 3 TO TURN ON ICON
          JP      DS23
          AISC    08
DS23:     XIS     0       ;SAVE IN RAM
          XIS     0
          CBA
          XAD     DSPPTR  ;SAVE POINTER FOR NEXT CYCLE
          JMP     CHKT    ;CHECK IN WITH INPUT CLOCK
;
;OUTPUT DIGIT #4 DATA FROM B REGISTER
;
```

```
DS44:   CBA
DSOUT5: LBI   TEMP1
        X     0
        CLRA                ;USE SECOND TABLE FOR 4TH DIGIT
        AISC  ((SEGTL2 AND 0F0H) / 010H)
        JP    DS22          ;GO OUTPUT
;
;ZONE POINTER
;
ZONPTR: LBI   DSPNUM
        LD    0
        ADD                 ;DSPNUM TIMES 2
        LBI   ZN1L          ;SET UP BR
        CAB
        RET
        PAGE
        SBTTL 'PAGE TWO SUBROUTINES'
;
        IF    ($ LT 080H)
        ORG   080H
        ENDIF
;
ENDW:   JSR   CANCEL  ;CANCEL PAUSE & WATERING, SET CLOCK MODE
WTROFF: LBI   OUTNUM  ;SET OUTPUT NUMBER TO INVALID ZONE NUMBER
        STII  0FH
        JSR   OUTOFF  ;TURN OFF ALL VERSIONS (DECODED OR BITWISE OUTPUTS)
MAIN:   JMP   DISPLY  ;MAIN RETURN (NOT A SUBROUTINE)
CHKTRN: JMP   CHKT    ;SET RAM POINTER & POWER LINE TRANSISTION CHECK
DNUMBR: LD    0       ;DISPLAY A 0-N VALUE AS A 1-N+1 VALUE
        AISC  01
        JMP   DSOUT2
BLANK:  LBI   LTRBLK  ;OUTPUT A BLANK
DSOUT3: CBA           ;USE B REG VALUE AS DISPLAYED VALUE
        JMP   DSOUT2
DSPOUT: LD    0       ;OUTPUT ONE DIGIT TO DISPLAY
DSOUT2: JMP   DSOUT   ; CALL ONLY FROM TOP OF STACK
DSOUT4: JMP   DS44    ;DISPLAY 4TH SPECIAL DIGIT FROM DIFFERENT TABLE
DSEXIT: JMP   DSEX    ;"JMP" TO END OF DISPLAY- SPECIAL BITS & EXIT DISPLAY
NEWSUM: JSR   CALSUM  ;CALCULATE NEW CHECKSUM & EXIT TO MAIN
        JP    MAIN
;
LDXIS2: LD    0       ;DOUBLE INCREMENT
        XIS   0
LDXIS:  LD    0
        JP    HX3
;
;ARITHMETIC SUBROUTINES
;
;HEX INCREMENT/DECREMENT ROUTINES- NO SKIP ON RETURN
;
INCHEX: SC            ;7 CYCLES
INCHX2: CLRA          ;6 CYCLES
HEXADD: ASC
        NOP
HX3:    XIS   0
DELAY2: NOP           ;IN CASE IT SKIPS
        RET
DECHEX: RC            ;DECREMENT BY ONE
DECHX2: CLRA          ;DECRMENT ACCORDING TO CARRY (CARRY = 0 >> DECREMENT)
SUBHEX: COMP          ;SUBTRACT IN HEX (M - A)
        JP    HEXADD
;
;BCD ARITHMETIC ROUTINES
```

```
;
BCDINC: SC
BCD2:   CLRA
BCDADD: AISC    06
BC3:    ASC
        AISC    0AH     ;ADD TEN
        NOP
        JP      HX3
DECBC2: CLRA
        COMP
        JP      BC3
;
;DELAY FOR READING SHORT PULSE WIDTH
;
DELAY4: NOP
        JP      DELAY2
;
;
;INCREMENT MINUTES (MODULO 60)
;SKIP ON WRAP TO 60. POINT AT LSD OF HOURS ON RETURN IF NO SKIP
;
;26 CYCLES TYP.
;
INCMIN: LBI     CKMINL  ;CLOCK MINUTES ONLY
        JSR     BCDINC  ;INCREMENT LSD
        JSR     INCHX2  ;CARRY
        LD      0       ;BACK UP TO MSD MINUTES & SEE IF 60 MINUTES YET
        XDS     0
        LD      0
        AISC    0AH
        RET             ;NOT YET- NO SKIP ON RETURN- CARRY ALWAYS CLEARED
        STII    0       ;YES- RESET TO 00
        RETSK           ;EXIT
;
;INCREMENT HOURS WITH AM/PM- ENTER POINTING AT LSD HOURS
;
;26 CYCLES TYP.
;
INCHRS: JSR     BCDINC  ;INCREMENT LSD
        SKC             ;SEE IF JUST WENT TO 10 O'CLOCK
        JP      INC1    ;NO
        JP      INCHEX  ;YES- SET MSD & EXIT WITH CARRY CLEAR
INC1:   SKMBZ   0       ;SEE IF JUST WENT TO 12 OR "13" O'CLOCK- SKIP IF NOT
        AISC    0FH     ;IS IT NOW 11 O'CLOCK
        RET             ;YES- EXIT
        AISC    0FH     ;IS IT NOW 12 O'CLOCK (DAY INTERVAL)?
        JP      INC3    ;YES
        LD      0       ;NO- WRAP FROM 12 TO 1
        XDS     0
        STII    1
        RMB     0       ;CLEAR MSD
        RET
INC3:   SKMBZ   1
        JP      INC4
        SMB     1       ;SET TO PM
        RET
INC4:   RMB     1       ;SET TO AM
        RETSK           ;SKIP AT DAY INTERVAL
;
        PAGE
        SBTTL   'MISC. SUBROUTINES'
;
```

```
;ZONE CHECK SUBROUTINE
;
;
;CHECK ZONE IF IT IS ON SELECTED PROGRAM- NO SKIP ON RETURN IF NOT ON PGM
;THEN MOVE WATER TIME TO WTIM CELLS & CHECK IF ZERO- NO SKIP ON RETURN IF ZERO
;IF ALL IS OKAY, SKIP ON RETURN
;
;71 CYCLES MAX.
;
CHKZON: LBI     ZNFLGL
        LDD     DSPNUM  ;SEE IF ZONE IS ON A OR B PGM
        JSR     TSTBIT
        AISC    01      ;SKIP IF ON PGM B- SET ACC TO 1
        AISC    02
        NOP
        LBI     MODE
        SKMBZ   3
        JP      CHKZ2   ;A/B MODE
        XOR             ;TEST ACCUM A/B FROM ZONE WITH SELECTED MODE
        LBI     TEMP1
        X       0
        SKMBZ   0       ;CHECK COMPARISON
        RET             ;NOT SAME PROGRAM- NO SKIP ON RETURN
CHKZ2:  JSR     ZONPTR  ;SAME OR PGM A/B (MANUAL)
        JSR     SETWTM  ;MOVE ZONE TIME TO WATERING CELLS
;
;CHECK IF WATER TIME IS ZERO
;
CHKZ:   LBI     WTIML
        CLRA
        SKE
        RETSK           ;SKIP- NOT ZERO
        LBI     WTIMH
        SKE
        RETSK
        RET             ;ZERO- NO SKIP;
;
;SET WATER TIME CELLS FROM CURRENT RAM POINTER & RESET DIVIDER
;
SETWTM: LD      0
        XIS     0
        XAD     WTIML
        LD      0
        XAD     WTIMH
        CLRA            ;SET DIVIDER TO DIVH MINUS ONE = 0
        XAD     WDIVH   ; EXTRA COUNT INCREMENTED WHEN STARTING WATER
        RET
;
;
;START TIME POINTER
;
STRPTR: LDD     DSPNUM
STRPT2: AISC    0FH
        LBI     ST1MIN
        AISC    0FH
        LBI     ST2MIN
        AISC    0FH
        LBI     ST3MIN
        AISC    0FH
        LBI     ST4MIN
        AISC    0FH
        LBI     ST5MIN
        AISC    0FH
```

```
        LBI     ST6MIN
        RET
;
;CLEAR PENDING START TIMES
;
CLRSTR: LBI     SFLAG    ;IF CLEARING ALL PENDING STARTS, ALSO
        RMB     3        ; CLEAR SHORT FLAG
        LBI     TEMP3
        STII    0FH
CLRS1:  JSRP    CHKTRN   ;ALWAYS CHECK IN WITH LINE FREQ. INPUT
        LBI     TEMP3
        JSR     INCSTR   ;INCREMENT TO NEXT START TIME
        RET              ;END
        JSRP    LDXIS2
        RMB     3        ;CLEAR PENDING FLAG OF START TIME
        JP      CLRS1

;
;INCREMENT TO NEXT START TIME
;
;CALL WITH "B" POINTING TO COUNTER RAM CELL. INCREMENTS FIRST, THEN POINTS
; TO START TIME.
;SKIP ON RETURN WITH B POINTING TO NEXT START TIME.
;NO SKIP ON RETURN IF NO MORE START TIMES
;
INCSTR: JSRP    INCHEX
        X       0
        XDS     0
        AISC    0BH      ;0-5 VALUE?
        JP      INCS1    ;YES
        AISC    0FH      ;6 ?
        RET              ;YES- NO SKIP ON RETURN
        CLRA
        X       0.       ;WRAP TO ZERO
INCS1:  LD      0
        JSR     STRPT2   ;POINT AT START TIME ACCORDING TO ACCUM.
        RETSK            ;SKIP ON RETURN
;
;CONVERT START TIME MINUTES CODE TO MINUTES IN TEMP1 & 2
;SKIP ON RETURN IF VALID MINUTES, NO SKIP IF OFF
;
STCONV: JSR     STRPTR
STCNV2: LD      0        ;SEE IF OFF
        COMP
        AISC    0CH
        RET              ;OFF
        CLRA
        SKMBZ   0
        AISC    05
        XAD     TEMP1
        JSR     SHIFTR   ;SHIFT RIGHT ONE BIT->> ACC
        XAD     TEMP2
        RETSK
;
;SHIFT MEMORY VALUIE RIGHT ONE BIT ->>> ACC.
;
SHIFTR: CLRA
        SKMBZ   1
        AISC    01
        SKMBZ   2
        AISC    02
        SKMBZ   3
        AISC    04
```

```
        RET
;
;CANCEL PAUSE & WATERING. RESET TO CLOCK MODE
;
CANCEL: LBI    WTRFLG  ;RESET WATER ENABLE & PAUSE
        RMB    3       ;WATER ENABLE
        RMB    2       ;PAUSE
        LBI    MODE
        STII   0AH     ;END WATER CYCLE- BACK TO CLOCK
        RET
;
;TURN OFF TRIAC DRIVE
;
OUTOFF: OGI    0BH
        LBI    0FH
        OBD            ;TURN OFF FIRST, THEN LOAD
        LBI    GPORT   ;KEEP G PORT RAM COPY
        STII   0BH
        RET
;
;INCREMENT ZONE (NUMBER IN DSPNUM) BY ONE TO SELECTED LIMIT
;SKIP ON RETURN IF WRAP TO ZERO
;
INCZON: LBI    DSPNUM
        JSRP   INCHEX  ;INCREMENT BY ONE
        LBI    OPTION  ;CHECK LIMIT
        SKMBZ  1
        AISC   02      ;4 ZONES- +6
        SKMBZ  2
        AISC   04      ;6 ZONES- +4
        AISC   07      ;8 ZONES- +2
        RET
        LBI    DSPNUM  ;WRAP TO ZERO
        STII   0
        RETSK
;
;INIT ZONES TO 5 MINUTES
;
INITZN: STII   05      ;SET ALL ZONE TIMES TO 5 MINUTES
        CLRA
        XIS    0
        JP     INITZN
        RET
;
;BIT FUNCTIONS- ALL OPERATE ON RAMBIT [ACC] WHERE ACC = BIT NUMBER
; FROM 0-7 IN TWO CONSECUTIVE RAM CELLS. NO RAM ADDRESS WRAP ALLOWED.
;
;22 CYCLES EACH (MAX)
;
;TEST BIT- SKIP ON RETURN IF TRUE.
;
TSTBIT: AISC   0FH
        JP     TST0
        AISC   0FH
        JP     TST1
        AISC   0FH
        JP     TST2
        AISC   0FH
        JP     TST3
        X      0
        XIS    0
        JP     TSTBIT
TST0:   SKMBZ  0
```

```
            RETSK
            RET
TST1:   SKMBZ   1
            RETSK
            RET
TST2:   SKMBZ   2
            RETSK
            RET
TST3:   SKMBZ   3
            RETSK
            RET
;
;SET BIT FUNCTION
;
SETBIT: JSR     STBIT
            X       0
            XIS     0
STBIT:  AISC    0FH
            SMB     0
            AISC    0FH
            SMB     1
            AISC    0FH
            SMB     2
            AISC    0FH
            SMB     3
            RET
;
;CLEAR BIT FUNCTION
;
CLRBIT: JSR     CLBIT
            X       0
            XIS     0
CLBIT:  AISC    0FH
            RMB     0
            AISC    0FH
            RMB     1
            AISC    0FH
            RMB     2
            AISC    0FH
            RMB     3
            RET
            PAGE
            SBTTL   'TIMEBASE INPUT & CORRECTION'
;
;
;CHECKS 50/60 HERTZ INPUT FOR TRANSITIONS AND INCREMENT PRESCALER ACCORDINGLY
;ALSO PROCESSES CLOCK CORRECTION SCHEME
;
;ALWAYS EXIT WITH CARRY CLEAR.
;
;133 CYCLES MAX., 14 MIN. WHEN INPUT IS LOW, 28 MIN WHEN INPUT IS HIGH
;   36 CYCLES TYPICAL IF INPUT IS PROCESSED.
;
;ALLOW 200 CYCLES MAX PROCESSING TIME BETWEEN CALLS TO CHKTRN. (WITH 26 US CLK)
;
CHKT:   SKT                 ;TIMER DONE?
            JP      CHKT1   ;NO
CHKT0:  LBI     PCNTL   ;YES- INCREMENT POWER FAIL TIMER
            JSRP    INCHEX
            JSRP    INCHX2
            LBI     PWRFLG
            SKMBZ   2       ;POWER ALREADY FAILED?
```

```
           JP      CHKT2      ;YES
           SKC                ;NO- SEE IF COUNT OVER MAX (POWER JUST FAILED)
           JP      CHKT1      ;NO
           SMB     2          ;YES- POWER JUST FIALED- SET FLAG
           LBI     CKDIVL
           STII    0FH        ;SET CKDIVL TO F SO DISPLAY WILL SHOW (NO FLASH)
CHKT37:    JMP     CHKT3      ;EXIT, SETTING 4 SECOND FLAG & CLEARING COUNTER
;
CHKT2:     LBI     WTRFLG     ;POWER FAIL- ALWAYS SET DISPLAY UPDATE
           SMB     1
           JSR     CKPCNT     ;CHECK IF PCNT IS SAME AS CALIBRATION VAL
           JP      CHKT37     ;YES- EXIT SETTING 4 SEC. FALG & RESET COUNT
;
;
CHKT1:     RC
           LBI     TEMP4
           INIL
           X       0
           SKMBZ   2
           JP      CHKT66     ;WAS A ONE
;
CHKT20:    LBI     PWRFLG     ;WAS A 0- SAVE BIT POLARITY FOR NEXT CYCLE
           RMB     1
CHKT21:    LBI     CLKFLG
           RMB     3          ;ALWAYS CLEAR CLOCK FLAG
           RET                ;EXIT
;
CHKT66:    LBI     PWRFLG     ;ONE INPUT
           SKMBZ   1          ;WAS IT ALREADY A ONE?
           JP      CHKT21     ;YES- EXIT
           SMB     1          ;NO- SET RAM BIT & PROCESS TRANSISTION
           SKMBZ   2          ;WAS POWER OFF?
           JMP     CHKT4      ;YES
           JP      CHKT5
;
CHKT4:     RMB     2          ;RESET POWER FAIL FLAG
           LBI     PVALH      ;COUNT MINUS CAL VALUE =>>> CKDIVL TO MINIMIZE ERROR
           LD      03
           COMP
           ADD
           LBI     CKDIVL
           X       0
CHKT5:     LBI     PRESCL     ;INCREMENT 1/4 SECOND PRESCALER
           JSRP    INCHEX
           SKC
           JMP     SHORT      ;NOT 1/4 SECOND YET
;
;1/4 SEC. INTERVAL
;
           LBI     KEYFLG
           CLRA
           AISC    03         ;INCREMENT SET TIMER (SET HRS, MIN)
           JSRP    HEXADD     ;ADD 3 + CARRY-
           LBI     OPTION     ;1/4 SECOND- RESET PRESCALER
           CLRA
           AISC    01         ;PRESET TO 60 HZ
           SKMBZ   0          ;CHECK 50/60 HZ OPTION
           JP      CHKT7      ;60 HZ
           AISC    03         ;50 HZ- ALTERNATE BETWEEN DIVIDE BY 12 OR 13
           LBI     PWRFLG
           SKMBZ   0
           JP      CHKT8      ;FLIP FLAG 1
           SMB     0          ;FLIP FLAG 0- SET FLIP FLAG
```

```
        AISC    0FH     ;SUBTRACT ONE (DIVIDE BY 13) & SKIP
CHKT8:  RMB     0
CHKT7:  LBI     PRESCL  ;SAVE
        X       0
;
        LBI     WTRFLG  ;SET 1/4 SEC. DISPLAY UPDATE FLAG
        SMB     1
        LBI     CKDIVL  ;INCREMENT 4 SECOND DIVIDER
        JSRP    INCHEX
        SKC
        JMP     SHORT   ;EXIT
        LBI     CKDIVL  ;RESET 1/4 SEC TO 4 SEC DIVIDER
        STII    DIVL
        JSR     CKPCNT  ;4 SEC.- CHECK IF PCNT IS EQUAL TO CALIBRATION
CHKT70: JMP     CHKT3   ;YES- NO ADJUSTMENT REQUIRED TO CALIBRATION
        LBI     FLAGI   ;NO- IF JUST RESET, TRACK CALIBRATION VALUE
        SKMBZ   3
        JP      CHKT79  ;ALREADY INITIALIZED
        SMB     3
        LBI     PCNTL   ;TRACK- MOVE COUNT TO VALUE IMMEDIATELY
        LD      03
        XIS     03
        LD      03
        X       0
        JP      CHKT70  ;EXIT
CHKT79: SC              ;NO- ADJUST CALIBRATION BY +/- 1 COUNT
        LBI     PVALL
        LD      03      ;FIND POLARITY OF DIFFERENCE BETWEEN PCNT & PVAL
        CASC
        NOP
        XIS     03      ;DUMMY SAVE IN PCNT (WILL BE RESET ANY WAY)
        LD      03
        CASC
        NOP
        XDS     03      ;POINT BACK AT PVALL
        SKC
        JP      CHKT9
        JSRP    INCHEX  ;CALIBRATION VALUE IS LESS THAN COUNT- INCREMENT
        JSRP    INCHX2
        JP      CHKT3
CHKT9:  JSRP    DECHEX  ;CALIBRATION VALUE IS GREATER THAN CNT- DECREMENT
        JSRP    DECHX2
;
;ON 4 SECOND INTERVAL- SET FLAG & CLEAR POWER FAIL COUNTER
;
CHKT3:  LBI     KEYFLG
        SMB     1
        LBI     PCNTL
        STII    0
        STII    0
        RC              ;INSURE CARRY IS CLEAR FOR DSPOUT CODE
        PAGE
        SBTTL   'SHORT CIRCUIT INPUT'
;
;CHECK FOR ANY SHORT CIRCUIT PULSES & MEASURE TIME TO DETERMINE IF
;  EXCESSIVE CURRENT (> 3.5 AMPS PEAK) REQUIRING IMMEDIATE ACTION.
;  IF NOT, INCREMENT SHTCNT TO BE PROCESSED BY MAIN IF LOW CURRENT SHORT
;  OCCURS. TRIGGERS AFTER ABOUT 150 MS, ALLOWING FOR VALVE INRUSH CURRENT.
;  IF DEAD SHORT, TRIGGERS IMMEDIATELY TO SAVE TRIACS.
;
SHORT:  LBI     CLKFLG  ;WAS CLOCK FLAG SET FROM PRIOR SHORT INPUT MEASUREMENT
        LD      0
        RMB     3       ;ALWAYS CLEAR FLAG
```

```
            AISC    08
            JP      SHRT7       ;NOT SET
            JMP     CHKT        ;SET- PROCESS EXTRA CLOCK CYCLE
   SHRT7:   RC                  ;ANY COUNTS IN SIO COUNTER REGISTER?
            CLRA
            XAS
            AISC    OFH
            RET                 ;NO COUNTS- JUST EXIT
            LBI     SHTCNT      ;COUNTS- INCREMENT SOFTWARE COUNTER BY ONE
            LD      0
            AISC    (16 - SHTLIM)
            JP      SHRT30
            LBI     OUTNUM      ;TURN VALVES OFF IMMEDIATELY
            STII    OFH
            JMP     OUTOFF
   SHRT30:  JSRP    INCHEX
            LBI     SWNDOW      ;START WINDOW TIMER
            AISC    OFH         ;  (IF FIRST SHORT PULSE INPUT)
            STII    WINDOW
            LEI     SHFMOD      ;SET SIO TO SHIFT MODE TO READ DIRECTLY
            LBI     PWRFLG
            SMB     1
            INIL
            AISC    08          ;UPDATE CKO INPUT STATUS
            AISC    08
            NOP
            AISC    OCH
            RMB     1
            RC                  ;RESET CARRY TO INSURE SK STAYS LOW
            LDD     PVALH       ;SET UP TIMER TO WITH SPEED COMPENSATED VALUE
            COMP
            AISC    01          ;TWO'S COMPLIMENT (SET UP FOR INCREMENT TIMING)
            LBI     OPTION
            SKMBZ   0
            JMP     SHRT8
            AISC    OEH         ;IF 50 HZ, INCREASE LIMIT TIME (LONGER CYCLE)
            CLRA                ;LIMIT TO ZERO
   SHRT8:   XAD     TMPTIM      ;SAVE HIGH CURRENT TRIP LEVEL IN TMPTIM
;
;WAIT FOR NEXT SHORT PULSE INPUT
;
   SHRTA:   XAS
            AISC    08          ;INPUT STILL LOW?
            JP      SHRTA       ;YES- WAIT FOR HIGH INPUT
            LBI     TMPCNT
            STII    04          ;SET UP TIMEOUT FOR WAITING FOR NEXT LOW
;
   SHRTB:   SKT
            JP      SHRT1
            LBI     TMPCNT
            LD      0
            AISC    OFH
            JP      SHRT3       ;TIMEOUT- POWER JUST FAILED- EXIT
            X       0
   SHRT1:   XAS                 ;INPUT STILL HIGH?
            AISC    08
            JP      SHRTC       ;NO- JUST WENT LOW AGAIN- GO MEASURE TIME
            INIL
            LBI     TEMP4       ;CHECK IF ANY LINE TRANSISTIONS
            X       0
            SKMBZ   2
            JP      SHRT2       ;CKO IS A ONE
            LBI     PWRFLG      ;CKO IS A ZERO
```

```
              RMB      1
              JP       SHRT22     ;KEEP LOOPING
    SHRT2:    LBI      PWRFLG
              SKMBZ    1          ;TRANSISTION?
              JP       SHRT22     ;NO- KEEP LOOPING
              SMB      1          ;SET STATUS TO ONE
              LBI      CLKFLG     ;YES- HAS ONE CYCLE ALREADY ELAPSED?
              SKMBZ    3
    SHRT3:    JMP      SHRTEX     ;YES- TIMEOUT EXIT
              SMB      3          ;NO- SET CLOCK FLAG
    SHRT22:   JMP      SHRTB      ;LOOP
    ;
    ;23 CYCLE LOOP TO MEASURE SHORT INPUT PULSE WIDTH
    ;
    SHRTC:    RC
              XAS                 ;INPUT STILL LOW?
              AISC     08
              JP       SHRT4      ;YES
              LBI      SHTCNT     ;HIGH- INCREMENT SHORT COUNT BY ONE & EXIT
              JSRP     INCHEX
              JP       SHRT3
    SHRT4:    LBI      OPTION     ;IF OPTION BIT 3 IS ONE DELAY TO 23 CYCLES, ELSE 19
              SKMBZ    3
              JSRP     DELAY4
              LBI      TMPTIM
              JSRP     INCHEX     ;COUNT TIME
              SKC
              JMP      SHRTC      ;LOOP
    ;
    ;HIGH CURRENT FUSE TRIPPED
    ;
    FUSE:     LBI      OUTNUM     ;TURN VALVES OFF IMMEDIATELY
              STII     0FH
              JSR      OUTOFF
              LBI      SHTCNT     ;SET SHTCNT TO MAX TO FORCE ZONE ADVANCE
              STII     SHTLIM
              LBI      SWNDOW     ;SET WINDOW TIMER TO INSURE PROCESSING
              STII     WINDOW
    ;
    SHRTEX:   LBI      PWRFLG     ;ALWAYS SET CKO STATUS LOW TO FORCE EXTRA CLOCK
              RMB      1
              LEI      CNTMOD     ;SWITCH BACK TO COUNT MODE
              RC
              CLRA
              XAS
              LBI      CLKFLG     ;ANY LINE PULSES WHILE WAITING?
              SKMBZ    3
              JMP      CHKT5      ;YES- GO PROCESS
              JMP      CHKT       ;NO- GO SEE IF LINE INPUT HAS A TRANSISTION
    ;
    ;CHECK IF PCNT IS EQUAL TO PVAL- SUBROUTINE
    ;
    CKPCNT:   LBI      PCNTL
              LD       03
              SKE
              RETSK               ;NOT EQUAL- SKIP ON RETURN
              XIS      03
              LD       03
              SKE
              RETSK
              RET                 ;EQUAL- NO SKIP ON RETURN
              PAGE
```

```
        SBTTL 'MAIN ENTRY #2- SKIP DISPLAY'
;
;
;MAIN ENTRY SKIPPING DISPLAY SO SIO COUNTS DON'T GET LOST
;
MAIN2:  JSRP    CHKTRN          ;CHECK IN WITH CHKT
        LBI     SHTCNT          ;SEE IF SHORT COUNTER OVER LIMIT
        LD      0
        AISC    (16 - SHTLIM)   ;SEE IF OVER LIMIT (FUSE JUST TRIPPED)
        JP      CHKDSP          ;NOT YET- GO CHECK IF TIME TO UPDATE DISPLAY
        LBI     SHTCNT          ;YES- CLEAR COUNT & SET FLAG
        STII    0
        LBI     SWNDOW          ;RESET WINDOW TIMER
        STII    0
        LBI     PWRFLG
        SMB     3               ;SET FLAG & TRY NEXT ZONE (OFF IF SINGLE ZONE MANUAL)
        LBI     SFLAG
        LD      0
        SMB     3               ;FLAG THAT A SHORT HAS OCCURRED
        AISC    08              ;ALLOW ONLY ONE SHORT PER WATER CYCLE, ELSE PUMP SHORT
        JMP     NXTZON          ;
        JMP     STOPW           ;STOP ALL WATERING, INCLUDING PENDING STARTS
;
CHKDSP: LBI     WTRFLG          ;CHECK 1/4 SECOND UPDATE FLAG
        SKMBZ   1
        JSRP    MAIN            ;TIME TO UPDATE- GO TO DISPLAY THRU "MAIN"
        JMP     CHKCLK          ;NOT TIME- CHECK CLOCK
;
;TURN WATER ON/OFF
;
WTRON:  LDD     DSPNUM
        LBI     OUTNUM          ;SEE IF OUTPUT ALREADY HAS SAME CODE
        X       0               ;SAVE DSPNUM IN OUTNUM
        SKE
        JSR     OUTOFF          ;NO- TURN OFF PUMP & THEN LOAD NEW NUMBER
        LDD     DSPNUM
        LBI     OPTION          ;8 ZONE DECODE VERSION?
        SKMBZ   2
        JMP     WTRON2          ;4 OR 6 ZONE VERSION
        CAB                     ;8 ZONES
        OBD
        OGI     OFH             ;LOAD ZONE # & TURN PUMP BACK ON
        LBI     GPORT
        STII    OFH             ;KEEP RAM COPY
        JSRP    MAIN
;
WTRON2: LBI     TEMP1
        STII    OFH
        STII    OFH
        LBI     TEMP1
        JSR     CLRBIT          ;CLEAR BIT IN TEMP CELLS (NUMBER TO BIT CONVERSION)
        LDD     TEMP1
        CAB
        OBD                     ;OUTPUT TO TRIACS- FALL THRU TO DISPLAY (MAIN)
        LBI     TEMP2
        OMG
        LD      0
        XAD     GPORT           ;KEEP RAM COPY
        PAGE
        SBTTL 'MAIN LOOP- DISPLAY PROCESSING'
;
;TOP OF MAIN LOOP WITH DISPLAY.- "CALL" THROUGH PAGE TWO JSRP.
```

```
;
;DISPLAY OUTPUT- PERFORM PRIOR TO FIRST KEY SCAN SO EN REGISTER IS SET UP
;
DISPLY: JSRP    CHKTRN  ;CHECK FOR LINE TRANSISITIONS
        RC
        LBI     DSPIMG  ;CLEAR DISPLAY RAM IMAGE AREA
        STII    0
        STII    0
        STII    0
        STII    0
        STII    0
        STII    0
        STII    0
        STII    0
        STII    0
        STII    0       ;CLEAR DSPPTR TOO
        LBI     WTRFLG  ;RESET DISPLAY UPDATE FLAG
        RMB     1
        SKMBZ   0       ;SEE IF CONTROL HAS BEEN RESET & NOT PROGRAMMED
        JP      DSNORM  ;NORMAL- NO FLASH
        LBI     CKDIVL  ;RESET- FLASH TIME
        SKMBZ   1
        JP      DSNORM
        JSRP    DSEXIT  ;OFF THIS CYCLE
DSNORM: LBI     PWRFLG
        SKMBZ   3       ;FUSE TRIPPED?
        JMP     DSFUSE  ;YES
        LBI     WTRFLG  ;PAUSED?
        SKMBZ   2
        JMP     DSPPSE  ;YES
        LDD     MODE    ;NO- VECTOR TO DISPLAY ROUTINE ACCORDING TO MODE
        AISC    0EH
        JMP     DSPSTR  ;START TIME MODE
        AISC    0EH
        JMP     DSPDAY  ;DAY MODE
        AISC    0EH
        JMP     DSPZON  ;ZONE MODES
        AISC    0CH
        JMP     DSPWTR  ;MANUAL MODES
        AISC    0FH
        JMP     DSPCLK  ;CLOCK TIME
        AISC    0FH
        JMP     DSCKDY  ;CLOCK DAY
;
;DISPLAY RAIN MODE
;
        LBI     CKDIVL  ;FLASH "OFF"
        SKMBZ   1
        JP      DSRAIN
        JSRP    DSEXIT  ;OFF- BLANK DISPLAY
DSRAIN: LBI     LETRF   ;DISPLAY "OFF" FOR RAIN MODE
        JSRP    DSOUT3
        LBI     0
        JSRP    DSOUT3
        JSRP    BLANK
        LBI     LETR2F
        JSRP    DSOUT4
        JSRP    DSEXIT
;
;DISPLAY FUSE FLASHING
;
DSFUSE: LBI     CKDIVL
```

```
        SKMBZ   1
        JP      DSF1        ;ON
        JSRP    DSEXIT      ;OFF
DSF1:   LBI     05          ;PRINT "FUSE"
        JSRP    DSOUT3
        LBI     LETRU
        JSRP    DSOUT3
        LBI     LETRF
        JSRP    DSOUT3
DSPF2:  LBI     LETR2E
        JSRP    DSOUT4
        JSRP    DSEXIT
;
;DISPLAY PAUSE MODE
;
DSPPSE: LBI     CKDIVL
        SKMBZ   1
        JP      DSPSE1      ;ON
        JSRP    DSEXIT
DSPSE1: LBI     05          ;PRINT " PSE"
        JSRP    DSOUT3
        LBI     LETRP
        JSRP    DSOUT3
        JSRP    BLANK
        JP      DSPF2
;
;DISPLAY ZONE MODE & WATERING TIME
;
DSPZON: LBI     WTRFLG      ;WATERING?
        SKMBZ   3
        JMP     DSPWTR      ;YES- DISPLAY WATERING TIME
        JSR     CHKZON      ;NO- ZONE & PGM MATCH?-> MOVE TIME TO WTRTIM...CHK ZERO
DSPW7:  JP      DSOFFZ      ;NOT ON SAME PROGRAM OR WATER TIME IS ZERO
DSPWTR: JSR     CHKZ        ;IF MANUAL, CHECK IF WATER TIME IS ZERO
        JP      DSOFFZ      ;YES- DISPLAY "OFF"
        LBI     WTRFLG      ;WATERING?
        SKMBZ   3
        JP      DSONZ       ;YES- ALTERNATE BETWEEN "ON" & TIME
DSPW9:  LBI     WTIML
        JSRP    DSPOUT      ;PRINT WATER TIME
        JSR     ZNICON      ;SET/CLEAR CARRY FOR ZONE ICON
        LBI     WTIMH
        JSRP    DSPOUT
DSPW11: LBI     DSPNUM
        JSRP    DNUMBR      ;DISPLAY ZONE NUMBER + 1
        JSRP    BLANK
        JSRP    DSEXIT      ;EXIT
;
DSONZ:  LBI     CKDIVL
        SKMBZ   2           ;ALTERNATE AT 1 SEC. PER SCREEN
        JP      DSPW9       ;SHOW TIME THIS CYCLE
        LBI     LETRN       ;DISPLAY "ON" THIS CYCLE
        JSRP    DSOUT3
        JSR     ZNICON      ;SET/CLEAR CARRY FOR ZONE ICON
        LBI     0
        JSRP    DSOUT3
        JP      DSPW11
;
DSOFFZ: LBI     LETRF
        JSRP    DSOUT3
        SC                  ;TURN ON ZONE ICON
        LBI     0
        JSRP    DSOUT3
```

```
            LBI     DSPNUM
            JSRP    DNUMBR      ;DISPLAY ZONE NUMBER (PLUS ONE)
            LBI     LETR2F
            JSRP    DSOUT4
            JSRP    DSEXIT
;
;SET/CLEAR CARRY FOR ZONE ICON (SUBROUTINE FOR DISPLAY PROCESSING)
;
ZNICON:     SC                  ;DETERMINE IF "ZONE" ICON IS ON
            LDD     MODE
            AISC    0AH
            RET                 ;YES
            AISC    0DH
            AISC    01
            RC                  ;NO- MANUAL PRGORAM OR ALL ZONES MODE
            RET
;
;DISPLAY CLOCK TIME
;
DSPCLK:     LBI     CKMINL
            JSRP    DSPOUT
            LBI     CKMINH
            JSRP    DSPOUT
            LBI     CKHRSL
            JSRP    DSPOUT
            LBI     CKHRSH
            LD      0           ;DISPLAY MSD OF HOURS FORMAT
DSPCK1:     JSR     DSOUT5      ;OUTPUT 4TH DIGIT FROM SECOND TABLE (AM/PM, MSD)
            JSRP    DSEXIT
;
;DISPLAY START TIME
;
DSPSTR:     SC                  ;START ICON ON
            LDD     DSPNUM      ;SEE IF OFF POSITION
            AISC    0AH         ;SKIP IF "OFF" DISPLAYED
            JSR     STCONV      ;POINT AT START TIME & CONVERT START MINUTES
DSPST2:     JMP     DSRAIN      ;YES- DISPLAY "OFF"
            LBI     TEMP1
            JSRP    DSPOUT
            LBI     TEMP2       ;OUTPUT START TIME MINUTES FROM TEMP1 & 2
            JSRP    DSPOUT
            JSR     STRPTR      ;OUTPUT HOURS
            JSRP    LDXIS
            JSRP    DSPOUT
            JSR     STRPTR
            JSRP    LDXIS2
            LD      0
            RMB     2
            RMB     3           ;CLEAR PENDING & PROGRAM BITS IN START HOURS
            X       0
            JMP     DSPCK1      ;OUTPUT MSD OF HOURS (IN CLOCK CODE)
;
;DISPLAY PROGRAM DAYS
;
DSPDAY:     LBI     MODE        ;
            LDD     DSPNUM      ;PRE-LOAD DSPNUM
            SKMBZ   0
            LBI     DAYSBH      ;PGM B
            LBI     DAYSAH      ;PGM A
            SKMBZ   3           ;INTERVAL OR WEEK DAYS?
            JP      DSWKDY      ;WEEK DAYS
            AISC    0FH         ;INTERVAL
```

```
              JP      DSDY1       ;SETTING
              AISC    0FH
              JP      DSTODY      ;"TODAY"
;
              LBI     LETRF       ;DISPLAY "WEEK DAY   "OFF"
              JSRP    DSOUT3
              LBI     0
              JSRP    DSOUT3
              JSRP    BLANK
DSDY8:        LBI     LTR2FW      ;"WEEK DAY + F"
              JSRP    DSOUT4
              JSRP    DSEXIT
;
DSDY1:        JSRP    DNUMBR      ;DISPLAY DAY NUMBER + 1
              JSRP    BLANK
              SC                  ;"EVERY S"
              JSRP    BLANK
              LBI     LTR2D       ;"DAY"
              JSRP    DSOUT4
              JSRP    DSEXIT      ;EXIT
;
DSTODY:       LD      0
              XDS     0           ;POINT AT INTERVAL COUNT
              JSRP    DNUMBR
              JSRP    BLANK
              LBI     LETRD       ;"D"
              JSRP    DSOUT3
              LBI     LTR2D       ;"DAY"
              JSRP    DSOUT4
              SC                  ;TURN ON "TO"
              JSRP    DSEXIT
;
DSWKDY:       AISC    09          ;SEE IF DAY "7"
              JMP     DSDY2       ;NO
              LBI     LETRF
              JSRP    DSOUT3      ;YES- OUTPUT "DAYS EVERY   OFF"
              LBI     0
              JSRP    DSOUT3
              SC
              JSRP    BLANK
              LBI     LTR2FD
              JSRP    DSOUT4
              JSRP    DSEXIT
DSDY2:        LD      0.          ;FLIP RAM POINTER TO WEEK DAYS
              XDS     01
              LDD     DSPNUM
              JSR     TSTBIT
              JMP     DSDY7       ;OFF- DISPLAY "OFF"
              LBI     0
              JSRP    DSOUT3      ;DISPLAY "ON"
              JSRP    BLANK
              LBI     DSPNUM
              JSRP    DNUMBR      ;DISPLAY WEEK DAY NUMBER (+1)
              LBI     LTR2NW
              JSRP    DSOUT4      ;DISPLAY "WEEK DAY    N (LOWER CASE)"
              JSRP    DSEXIT      ;EXIT
;
DSDY7:        LBI     LETRF       ;DISPLAY "WEEK DAY N    OFF"
              JSRP    DSOUT3
              LBI     0
              JSRP    DSOUT3
              LBI     DSPNUM
```

```
            JSRP    DNUMBR
            JMP     DSDY8       ;"WEEK DAY   F"
;
;DISPLAY CLOCK DAYS
;
DSCKDY:     LBI     WKDAY
            JSRP    DNUMBR
            JSRP    BLANK
            LBI     LETRD
            JSRP    DSOUT3
            LBI     LTR2WD      ;PRINT "WEEK DAY"
            JSRP    DSOUT4
;
;EXIT DISPLAY- OUTPUT LAST "SPECIAL" BITS "CALLED" THRU "DSPSP"
;
DSEX:       LBI     MODE
            LD      0
            AISC    06          ;IN ANY MANUAL MODE?
            AISC    04
            JP      DSSP1       ;NO
            AISC    0DH         ;IN MANUAL A/B MODE?
            JP      DSSP4       ;NO- OTHER MANUAL MODES
            CLRA
            AISC    03          ;YES
            LBI     CKDIVL
            SKMBZ   1           ;CHECK FOR FLASH ON "MAN"
            AISC    08          ;ON- SET BIT 3
            JMP     DSPSP3
;
DSSP4:      CLRA
            LBI     CKDIVL      ;FLASH MANUAL ICON IN MAN A, B, ZONE
            SKMBZ   1
            AISC    08
            LBI     MODE
            JP      DSSP5       ;THEN SET UP A/B
;
DSSP1:      CLRA
DSSP5:      SKMBZ   3           ;"A" OR "B" DISPLAYED?
            JMP     DSPSP3      ;NO
            AISC    05
            SKMBZ   0           ;YES- TURN ON EITHER A OR B
            AISC    01
            SKC                 ;IF CARRY SET, TURN ON "TO" FOR "TODAY"
            AISC    0CH
            NOP
DSPSP3:     LBI     DSPIMG+8    ;SAVE SPECIAL BITS & SET UP CONTROL BITS
            XIS     0
            STII    0CH
;
;OUTPUT DISPLAY IMAGE TO COP472 (FAST SHIFT OUT)
;
SHFOUT:     LEI     SHFMOD      ;SET SIO TO SHIFT MODE, ENABLE L OUTPUTS (CS = 0)
            CLRA
            AISC    07H         ;STROBE L7 LOW TO SELECT COP472
            CAMQ                ;LOWER NIBBLE- DON'T CARE
            LBI     SWNDOW      ;INCREMENT SHORT WINDOW TIMER IF ACTIVE
            LD      0
            AISC    0FH
            JP      SHF2        ;ZERO- SKIP SHORT RESET
            JSRP    INCHEX
            SKC
            LBI     TEMP1       ;DUMMY
            LBI     SHTCNT      ;RESET SHORT COUNT AFTER WINDOW TIMES OUT (3/4 SEC)
```

```
            STII    0
SHF2:   LBI     DSPIMG
SHF1:   LD      0
        XIS     0
        SC
        XAS
        NOP
        NOP
        RC
        XAS
        CBA
        AISC    06
        JP      SHF1        ;LOOP UNTIL ALL TEN NIBBLES HAVE BEEN OUTPUT
        CLRA
        AISC    0FH         ;SET L7 HIGH AGAIN (D0-D3- DON'T CARE)
        CAMQ
        LEI     CNTMOD
        CLRA
        XAS                 ;CLEAR SIO TO COUNT SHORT COUNTS AGAIN
        PAGE
        SBTTL   'CLOCK ROUTINES'
;
;SEE IF ANY 4 SECOND TICKS & DO CLOCK.
;
CHKCLK: LBI     KEYFLG      ;ANY 4 SEC. TICKS?
        SKMBZ   1
        JP      CLOCK4      ;YES- PROCESS
        JMP     KEY         ;NO- CHECK FOR KEYS
;
;ON 4 SECOND INTERVAL
;
CLOCK4: RMB     1           ;CLEAR 4 SECOND FLAG
        JSRP    CHKTRN      ;CHECK FOR LINE TRANSISITIONS
        LBI     KEYTMR
        LD      0           ;INC KEY TIMER IF ACTIVE
        AISC    08H
        JSRP    INCHEX
        LBI     CKDIVH
        JSRP    INCHEX      ;INCREMENT MSD OF CLOCK MINUTES DIVIDER
        SKC
        JMP     CHKPND      ;NOT ON MINUTE INTERVAL YET
        LBI     CKDIVH
        STII    DIVH        ;RESET MIN. DIVIDER
        JSR     INCMIN      ;INCREMENT CLOCK MINUTES- SKIP IF NOT ON HOUR INTERVAL
        JMP     CHKSTR      ;GO CHECK START
        JSR     INCHRS      ;HOURS- DO HOURS PLUS AM/PM- SKIP ON DAY INTERVAL
        JMP     CLK33       ;NOT DAY INTERVAL YET
;
;MIDNIGHT- DAY INTERVAL- INCREMENT DAY
;
        LBI     WKDAY       ;INCREMENT WEEKDYA
        LD      0           ;MODULO 7 (0-6)
        AISC    0AH
        AISC    07H
        CLRA
        X       0
        LBI     DAYSAH      ;INCREMENT PROG DAYS COUNTERS IF REQ'D
        SKMBZ   3
        JP      CK1         ;WEEKDAY- SKIP
        LBI     DAYSAL      ;INTERVAL
        JSRP    INCHEX
        CASC                ;COMPARE WITH SETTING
```

```
          LBI      DAYSAL    ;RESET COUNT IF DAY COUNT > DAY SETTING
          LBI      TEMP1     ;DUMMY RESET
          STII     0
CK1:      LBI      DAYSBH    ;INCRMENT PROG DAYS COUNTERS IF REQ'D
          SKMBZ    3
          JP       CK2       ;WEEKDAY- SKIP
          LBI      DAYSBL    ;INTERVAL
          JSRP     INCHEX
          CASC               ;COMPARE WITH SETTING
          LBI      DAYSBL    ;RESET COUNT IF DAY COUNT > DAY SETTING
          LBI      TEMP1     ;DUMMY RESET
          STII     0
CK2:      JSR      CLRSTR    ;CLEAR ALL PENDING START TIMES AT MIDNIGHT
          LBI      WTRFLG    ;IF PAUSED AT MIDNIGHT, CANCEL WATERING TOO
          SKMBZ    2
          JSR      CANCEL    ;CLEAR PAUSED & RESET BACK TO CLOCK MODE
CLK33:    JSR      CALSUM    ;UPDATE CHECK SUM ONCE EACH HOUR
          PAGE
          SBTTL    'CHECK START TIME'
;
;CHECKS FOR START TIMES ON MINUTE INTERVAL
;
CHKSTR:   LBI      TEMP3
          STII     0FH
CHKS3:    JSRP     CHKTRN    ;CHECK IN WITH CHKT
          LBI      TEMP3
          JSR      INCSTR    ;INCREMENT TO NEXT START TIME
          JMP      CHKPND    ;DONE- GO CHECK FOR PENDING START TIMES & START WATER
          JSR      STCNV2
          JP       CHKS3     ;OFF- CHECK NEXT START TIME
          LBI      TEMP1     ;CONVERT START TIME MINUTES TO VALUE IN TEMP1 & 2
          LD       03
          SKE
          JP       CHKS3     ;NOT SAME
          XIS      03
          LD       03
          SKE
          JP       CHKSJ     ;NOT SAME- NEXT
          LDD      TEMP3
          JSR      STRPT2    ;POINT AT START TIME AGAIN
          JSRP     LDXIS
          LDD      CKHRSL
          SKE
          JP       CHKSJ     ;HOURS NOT THE SAME
          JSRP     LDXIS
          LD       0
          XAD      TEMP1     ;SAVE COPY OF MSD START HOURS FOR DAYS PGM TEST
          LD       0
          RMB      3
          RMB      2
          X        0
          LBI      CKHRSH    ;COMPARE WITH HOURS
          RMB      2         ;MAKE SURE TOP BITS OF HOURS ARE ALWAYS CLEARED
          RMB      3
          SKE
          JP       CHKSJ     ;HOURS NOT THE SAME
;
;START TIME IS SAME- CHECK DAY & PROGRAM (TEMP1 HAS A/B FLAG OF START)
;
          LBI      TEMP1
          SKMBZ    2
          LBI      DAYSBH    ;PROGRAM B
```

```
            LBI     DAYSAH
            SKMBZ   3           ;INTERVAL OR WEEK DAY
            JP      CHKS5       ;WEEK DAY
            LD      0
            XDS     0           ;INTERVAL
            JSRP    LDXIS       ;GET COUNT ->> ACC. & SUBTRACT FROM SETTING
            RC
            CASC
            JP      CHKS4       ;TODAY- SET PENDING FLAG (COUNT GETS RESET AT MIDNIGHT)
CHKSJ:      JMP     CHKS3       ;NOT TODAY
;
CHKS5:      LD      0
            XDS     01          ;POINT AT LSD OF WEEK DAYS
            LDD     WKDAY       ;SEE IF WEEK DAY FOR PROGRM IS ON
            JSR     TSTBIT
            JP      CHKSJ       ;ZERO- NO START TODAY
CHKS4:      LDD     TEMP3
            JSR     STRPT2      ;SET PENDING FLAG IN START TIME
            JSRP    LDXIS2
            SMB     3
            JP      CHKSJ
            PAGE
            SBTTL   'CHECK FOR PENDING START TIMES'
;
;CHECKS FOR ANY START TIMES THAT ARE PENDING & STARTS WATER IF SET.
;PERFORMED ON 4 SECOND INTERVAL.
;
CHKPND:     JSRP    CHKTRN      ;CHECK FOR LINE TRANSISITIONS
            LBI     WTRFLG
            SKMBZ   3           ;WATER ENABLED ALREADY?
            JMP     WTRTIM      ;WATERING- GO PROCESS WATER TIMER
            LBI     KEYTMR      ;SEE IF ANY KEYS ARE ACTIVE- NO START IF SO
            LD      0           ;GET KEYTMR
            AISC    08
            JSRP    MAIN        ;KEY ACTIVE- EXIT
            LDD     MODE
            COMP
            AISC    0CH         ;RAIN?
            JSRP    WTROFF
            LBI     TEMP3
            STII    0FH
CHKP1:      JSRP    CHKTRN      ;CHECK IN WITH CHKTRN
            LBI     TEMP3
            JSR     INCSTR      ;POINT AT NEXT START TIME
            JSRP    MAIN        ;NO MORE STARTS- EXIT TO TOP
            JSRP    LDXIS2
            LD      0
            AISC    08
            JMP     CHKP1       ;PENDING FLAG NOT SET- CHECK NEXT
            RMB     3           ;CLEAR PENDING FLAG
            SKMBZ   2           ;SET UP A/B
            LBI     05          ;ZONES B
            LBI     04          ;ZONES A
            CBA
            XAD     MODE        ;SET NEW MODE
            PAGE
            SBTTL   'START NEW CYCLE & DO WATER TIMER SERVICE'
;
;START WATER ON SELECTED ZONE OR ON ZONE 1- MOVE ZONE TIME TO WTIM CELLS
;
STRWTR:     LBI     WTRFLG      ;SET WATER ENABLE
            SMB     3
            LBI     MODE
```

```
            SKMBZ   3
            SKMBZ   0       ;SEE IF MANUAL ZONE MODE
            JP      STW2    ;NO
            JSR     CHKZ    ;YES- CHECK IF VALUE IN WTRTM CELLS IS ZERO
            JSRP    ENDW    ;ZERO- EXIT & RETURN TO CLOCK
            JP      WTRTIM  ;NOT ZERO- START WATERING SINGLE MANUAL ZONE
;
STW2:       LBI     DSPNUM
            STII    0       ;INIT AT ZONE 1 (0)
NXT1:       JSRP    CHKTRN  ;CHECK IN WITH CLOCK INPUT
            JSR     CHKZON  ;CHK IF ZONE ON PROGRAM AND IF WATER TIME NOT ZERO
            JMP     NXTZON  ;NOT ON PGM OR ZERO TIME- NEXT ZONE
;
;DECREMENTS WATER TIMER CELLS ON 4 SECOND INTERVAL & CHECKS
;IF POWER HAS FAILED.
;
WTRTIM:     LBI     WTRFLG  ;PAUSED?
            SKMBZ   2
            JSRP    WTROFF  ;PAUSED- EXIT
            LBI     PWRFLG  ;CHECK IF POWER FAILED
            SKMBZ   2
            JSRP    WTROFF  ;POWER OFF- TURN OFF VALVES, RETURN TO MAIN
WT4:        LBI     WDIVH
            JSRP    INCHEX  ;DO PRESCALER
            SKC
            JMP     WTRON   ;TURN ON ZONE- IN CASE POWER JUST CAME BACK ON
            LBI     SFLAG   ;AT END OF SUCCESSFUL MINUTE OF WATERING, RESET
            RMB     3       ;  SHORT COUNT FLAG FOR WATER CYCLE
            LBI     WDIVH   ;ON MINUTE INTERVAL, RESET PRESCALER
            STII    DIVH
            RC
            JSRP    DECBC2  ;DECREMENT IN BCD
            JSRP    DECBC2
            JSR     CHKZ
            JP      NXTZON  ;ZERO- DO NEXT ZONE
            JMP     WTRON   ;NOT ZERO
;
;INC TO NEXT ZONE & TURN ON WATER
;
NXTZON:     LBI     WTRFLG  ;WATERING?
            LD      0
            AISC    08
            JSRP    ENDW    ;NO- SKIP INCREMENT
            LBI     MODE    ;MANUAL ZONE?
            SKMBZ   3
            SKMBZ   0
            JP      NXT6    ;NO
            JSRP    ENDW    ;YES- STOP WATERING AFTER SINGLE ZONE
NXT6:       JSR     INCZON  ;INC TO NEXT ZONE
            JMP     NXT1    ;NOT ALL DONE YET
            JSRP    ENDW    ;ALL DONE- STOP WATERING, RETURN TO MAIN
            PAGE
            SBTTL   'CHECKSUM ROUTINE'
;
;CHECKSUM ROUTINE FOR PART OF CLOCK, START TIMES, DAYS, & ZONE FLAGS.
;   (ZONE TIMES VERIFIED BY RAM COPY FOR BETTER PERFORMANCE)
;
;CALL ONLY FROM TOP STACK LEVEL- USES ALL THREE LEVELS!!!
;
CALSUM:     JSRP    CHKTRN
            LBI     CHKSUM  ;INIT CHKSUM TO ZERO
            STII    0
            STII    0
```

```
            STII    0
            STII    0
            LBI     CKHRSL  ;DON'T ADD CLOCK MINUTES DECREASE PROBABILITY OF
            JSR     ADCK12  ;  RESET WHEN VALUES ARE ALREADY VALID
            LBI     DAYSAL
            JSR     ADDCHK
            LBI     WKDYAL
            JSR     ADDCHK
            LBI     ZNFLGL
            JSR     ADCHK8
            LBI     TEMP3   ;LOOP & ADD 2 NIBBLES OF START TIMES
            STII    0FH
CHKSM1:     JSRP    CHKTRN
            LBI     TEMP3
            JSR     INCSTR
            RET             ;ALL STARTS DONE
            JSR     ADCK12  ;ADD IN NEXT START TIME VALUE (ONLY 2 NIBBLES)
            JP      CHKSM1  ;LOOP TO NEXT START TIME
;
;ADD 11 BITS TO CHECKSUM (BIT 12 IS ALWAYS RESET)
;
ADCK12:     JSR     AD8
            LD      0
            LBI     TEMP1
            X       0       ;PUT IN TEMP1 & ZERO TEMP2
            RMB     3
            LBI     TEMP2
            CLRA
            XDS     0
            JP      ADCHK
;
;ADD FULL 16 BITS TO CHECKSUM
;
ADDCHK:     JSR     AD8     ;ADD 16 BIT VALUE TO CHECKSUM
ADCHK:      LDD     CHKSUM+2
            ASC
            NOP
            XAD     CHKSUM+2
            JSRP    LDXIS
            LDD     CHKSUM+3
            ASC
            NOP
            XAD     CHKSUM+3
            JSRP    LDXIS
            RET
;
AD8:        LDD     CHKSUM  ;ADD 8 BIT VALUE TO CHECKSUM
            RC
            ASC
            NOP
            XAD     CHKSUM
            LD      0
            XIS     0
            LDD     CHKSUM+1
            ASC
            NOP
            XAD     CHKSUM+1
            LD      0
            XIS     0
            RET
            PAGE
            SBTTL   'SET KEYS'
;
```

```
            IF      ($ GT 0560H)
            JP      ADRERR          ;SET KEY PAGE OVER 0560 HEX ADDRESS
            ENDIF

ORG     0560H
;
;SET KEY VECTOR TABLE
;
SETTBL:     .ADDR   STSTMN
            .ADDR   STSTHR          ;START TIMES
            .ADDR   STDAYS
            .ADDR   STEXIT          ;DAYS
            .ADDR   STZONL
            .ADDR   STZONH          ;ZONE TIMES
            .ADDR   STWTRL
            .ADDR   STWTRH          ;MANUAL MODES
            .ADDR   STWTRL
            .ADDR   STWTRH          ;MANUAL MODES
            .ADDR   STCKMN
            .ADDR   STCKHR          ;CLOCK TIME & DAY
            .ADDR   STEXIT
            .ADDR   STEXIT          ;RAIN MODE- IGNORE
;
;SET TIME KEYS (SETMIN, SETHRS). NEVER GETS HERE IF WATERING
;TEMP3 HAS 0 FOR SETMIN, 1 FOR SET HRS.
;
ST2:        SKMBZ   3               ;DEBOUNCE WAS SET- SEE IF TIMER IS DONE
            JP      SETEX           ;NOT YET- EXIT
            SKMBZ   2
SETEX:      JMP     MAIN2           ;EXIT- NO DISPLAY UPDATE
            SMB     3               ;TIME OUT- RESET TIMER TO 1/4 SECOND TIME
            JMP     ST5
;
;ENTRY FROM KEYBOARD HANDLER:
;
SETMH:      LBI     KEYTMR          ;SEE IF KEY TIMER IS ACTIVE
            SKMBZ   3
            JSRP    MAIN            ;NO-
            STII    KEYVAL          ;YES- RESTART TIMER- POINT AT KEYFLG
            SKMBZ   0               ;DEBOUNCE SET?
            JP      ST2             ;YES- GO SEE IF TIMER TIMED OUT YET
            SMB     0               ;NO- INCREMENT VALUE IMMEDIATELY AND START TIMER
            RMB     3               ; LONG DELAY VALUE
ST5:        SMB     2
;
;VECTOR ACCORDING TO MODE
;
            LBI     MODE            ;VECTOR TO SET ROUTINE ACCORDING TO MODE
            LD      0
            RMB     0
            X       0
            LBI     TEMP3
            ADD                     ;COMBINE MINUTES/HOURS KEY CODE WITH MODE
            X       0               ;SAVE IN TEMP3
            CLRA
            IF      (SETTBL AND 0F0H)
            AISC    ((SETTBL AND 0F0H) / 010H)
            ENDIF
            JID
;
;SET START TIME HOURS
;
STSTHR:     JSR     STSUB1  ;SCAN FOR FIRST AVAIL. START TIME
```

```
        JSRP    MAIN    ;ERROR- NO SPACE LEFT
        JSR     STSTPG  ;SET START TO CURRENT PROGRAM
        SKC             ;START TIME JUST TURNED ON FROM "OFF"?
STEXIT: JSRP    NEWSUM  ;YES- EXIT
        JSRP    LDXIS   ;POINT AT LSD HOURS
STST1:  JSR     INCHRS  ;INCREMENT HOURS OF START TIME OR CLOCK
        NOP             ;IGNORE SKIP
        JSRP    NEWSUM  ;EXIT
;
STSTMN: JSR     STSUB1  ;SCAN FOR FIRST AVAIL START TIME
        JSRP    MAIN    ;ERROR- NO SPACE LEFT
        JSR     STSTPG  ;SET START TO CURRENT PROGRAM
        SKC
        JSRP    NEWSUM  ;START TIME JUST TURNED ON- EXIT
        JSRP    INCHEX  ;INCREMENT MINUTES CODE
        AISC    05
        JSRP    NEWSUM  ;NO WRAP
        LD      0
        XDS     0       ;WRAPPED
        STII    0       ; WRAP TO ZERO CODE
        JSRP    NEWSUM

;
;SET CLOCK
;
STCKMN: LBI     MODE
        SKMBZ   0       ;CLOCK OR DAYS?
        JP      STCKDY  ;DAYS
        JSR     INCMIN  ;INCREMENT MINUTES MODULO 60
        NOP
        LBI     KEYFLG  ;INC TWICE IF IN SPEED UP MODE
        SKMBZ   3
        JSR     INCMIN
        NOP
        JSRP    NEWSUM

;
STCKHR: LBI     MODE
        SKMBZ   0
        JSRP    MAIN    ;DAYS- IGNORE HOURS KEY
        LBI     CKHRSL  ;INCREMENT CLOCK HOURS
        JP      STST1

;
STCKDY: LBI     WKDAY   ;INCREMENT CLOCK WEEKDAY
        JSRP    INCHEX
        AISC    0AH     ;SEE IF TIME TO WRAP
        JSRP    NEWSUM
        LBI     WKDAY
        STII    0
        JSRP    NEWSUM

;
;SET ZONE TIME
;
STZONH: JSR     CHKZON  ;SEE IF OFF OR ON DIFFERENT PROGRAM
        JMP     STZON3  ;OFF OR DIFF. PGM
        JSR     ZONPTR
        JSRP    LDXIS   ;POINT TO 10'S DIGIT
STZON2: JSRP    BCDINC
        JP      SAVZNJ  ;EXIT THROUGH "SAVZON"- EXITS TO MAIN

;
STZONL: JSR     CHKZON  ;SEE IF OFF OR ON DIFFERENT PROGRAM
        JP      STZON3  ;OFF OR DIFF. PGM
        JSR     ZONPTR
STZON1: JSRP    BCDINC
```

```
           JSRP    BCD2    ;INCREMENT ZONE MINUTES WITH CARRY TO TEN'S
           LDD     KEYFLG  ;IF IN SPEED UP MODE, INCREMENT TWICE
           AISC    08H
SAVZNJ:    JMP     SAVZON  ;EXIT THROUGH "SAVZON"- EXITS TO MAIN
           LD      0
           XDS     0
           NOP
           LD      0
           XDS     0
           JSRP    BCDINC
           JSRP    BCD2    ;INCREMENT A SECOND TIME
           JP      SAVZNJ
;
;TURN ZONE ON AND SET TO CURRENT PROGRAM
;
STZON3:    JSR     ZONPTR
           STII    01      ;INIT TO 1 MINUTE
           STII    0
           LDD     DSPNUM
           LBI     MODE
           SKMBZ   0       ;A OR B PROGM?
           JP      STZON4  ;B
           LBI     ZNFLGL  ;A
           JSR     CLRBIT
           JP      SAVZNJ  ;EXIT THROUGH "SAVZON"- EXITS TO MAIN
STZON4:    LBI     ZNFLGL  ;B
           JSR     SETBIT
           JP      SAVZNJ  ;EXIT THROUGH "SAVZON"- EXITS TO MAIN
;
STWTRL:    LBI     WTIML   ;INCREMENT WATER TIME MINUTES
           JMP     STZON1
STWTRH:    LBI     WTIMH
           JMP     STZON2
;
;SET PROGRAM DAYS
;
STDAYS:    LBI     MODE
           SKMBZ   0
           LBI     DAYSBH
           LBI     DAYSAH
           LD      0
           AISC    08
           JMP     STDY1   ;INTERVAL MODE
           LDD     DSPNUM  ;WEEKDAY- SEE IF FLIP MODE SCREEN IS UP
           AISC    09
           JSRP    MAIN    ;WRONG SCREEN- IGNORE KEY
STDY3:     CLRA
           XAD     DSPNUM  ;SET DSPNUM TO MODE ZERO, INTERVAL MODE
           RMB     3
           JSRP    NEWSUM
;
STDY1:     LDD     DSPNUM
           COMP
           AISC    02
JSRP       MAIN            ;WEEK DAY SCREEN- EXIT
AISC       0FH
JP         STDY2           ;"TODAY" MODE
JSRP       INCHEX          ;INCREMENT SETTING
AISC       0AH             ;WRAP AT 6 (7TH DAY)
JP         STDY9           ;NO WRAP
LD         0
XDS        0
STII       0
```

```
STDY9:   LD     0
         XDS    0         ;AFTER INCREMENTING SETTING, ALWAYS SET COUNT = SETTING
         LD     0
         XDS    0
         X      0
         JSRP   NEWSUM
;
STDY2:   LD     0
         XDS    0         ;INCREMENT COUNT, WRAPPING AT SETTING
         JSRP   INCHEX
         LD     0
         XDS    0         ;COMPARE COUNT & SETTING- LIMIT COUNT TO SETTING
         RC
         CASC
         JSRP   NEWSUM    ;SETTING IS GREATER THAN OR EQ. TO COUNT- EXIT
         STII   0         ;SETTING IS LESS THAN COUNT- WRAP COUNT TO ZERO
         JSRP   NEWSUM    ;EXIT
;
;SUBROUTINE FOR SET START TIME HOURS & MINUTES
;SCANS FOR NEXT AVAILABLE START TIME. RESETS CARRY IF NEW START TIME.
;
;NO SKIP ON RETURN IF NO MORE STARTS AVAILABLE.
;SKIP IF O.K., WITH B POINTING TO START TIME.

STSUB1:  LDD    DSPNUM    ;DISPLAY IN OFF POSITION
         AISC   0AH
         JP     STS1      ;NO- NORMAL
         LBI    DSPNUM    ;YES- SCAN FOR FIRST AVAILABLE START TIME
         STII   0FH
SCNST1:  JSRP   CHKTRN    ;CHECK IN WITH FREQ. INPUT
         LBI    DSPNUM
         JSR    INCSTR
         RET              ;NO MORE START TIMES AVAILABLE
         LD     0
         AISC   04        ;OFF?
         JP     SCNST1    ;NO- INCREMENT TO NEXT START TIME
STS1:    JSR    STRPTR    ;POINT AT START TIME [DSPNUM]
         SC
         LD     0         ;GET MINUTES CODE
         AISC   04H       ;OFF?
         RETSK            ;NO- EXIT
         RC
         X      0         ;YES- RESET CARRY TO FLAG START TIME JUST TURNED ON
         RETSK            ; SET MINUTES TO ZERO
;SET CURRENT START TIME TO CURRENT PROGRAM
;
STSTPG:  JSRP   LDXIS2
         RMB    2         ;SET TO CURRENT PRGRAM
         LDD    MODE
         X      0
         SKMBZ  0         ;SET A/B IN START TIME
         AISC   04
         XDS    0         ;SAVE NEW A/B STATUS IN START MSD HOURS
         LD     0         ;POINT AT MINUTES AGAIN
         XDS    0
         RET
         PAGE
         SBTTL  'CONTINUE WITH RESET'
;
;CONTINUE WITH RESET
;
RES2:    LBI    DSPNUM    ;POINT AT NEXT START TIME (SKIP ST #1)
```

```
               JSR     INCSTR
               JP      RES3        ;ALL STARTS DONE
               STII    0CH
               STII    2           ;INIT TO "OFF- 12:00 AM"
               STII    1
               JP      RES2
        RES3:  LBI     ST1HRL
               STII    2           ;SET START TIME 1 TO 2 AM
               LBI     CKHRSL      ;SET CLOCK TO 4 PM
               STII    04
               STII    02
               LBI     PVALL       ;INIT POWER FAIL CALIBRATION VALUE
               STII    PFTIML
               STII    PFTIMH
               LBI     ZN1L
               JSR     INITZN      ;INIT ZONE TIMES TO 5 MINUTES
               JSR     CALSUM      ;INIT NEW CHECKSUM
               LBI     ZX1L        ;INIT COPY ALSO
               JSR     INITZN
               JSRP    ENDW        ;GO INSURE WATER IS OFF AND SET CLOCK MODE
               PAGE
               SBTTL   'KEYBOARD SCAN'
        ;
        ;KEYBOARD INPUT HANDLER
        ;
        KEY:   JSR     CHKT1       ;CHECK FOR 60/50 HZ TRANSISTIONS WHILE WAITING
               SKT                 ; FOR TIMER TO COMPLETE (SERVICE KEY EVERY 16-26 MS)
               JP      KEY         ;
               JSR     CHKT0       ;PROCESS TIMER TRANSISTION
               LBI     TEMP1
               STII    0FH
               LBI     TEMP1       ;INSURE THAT L PORT IS HIGH
               CLRA
               AISC    0FH
               CAMQ
               LBI     GPORT
               RMB     3           ;STROBE OPTION LINE LOW
               OMG
               LBI     TEMP1       ;DUMMY LOCATION FOR UPPER NIBBLE
               INL                 ;READ OPTION BITS
               LBI     GPORT
               SMB     3
               OMG
               XAD     OPTION
               LBI     TEMP1
               STII    0BH         ;SET UP SCAN PATTERN
               LBI     TEMP3       ;SET UP COUNT
               STII    0
        KEY2:  LBI     TEMP1
               JSR     SHIFTR
               AISC    08          ;SET BIT 3 ALWAYS
               X       0
               LBI     TEMP2
               STII    0FH         ;SET TEMP2 TO "F"
               LBI     TEMP2
               CAMQ                ;STROBE KEY COLUMN
               INL                 ;READ L PORT IN
               AISC    01          ;ANY KEY?
               JP      KEY1        ;YES
               LBI     TEMP3       ;COUNT COLUMNS
               JSRP    INCHEX
               AISC    0EH         ;ALL COLUMNS STROBED?
               JMP     KEY2        ;LOOP
```

```
        LBI     KEYFLG  ;NO KEYS- RESET DEBOUNCE FLAG
        RMB     0
        JMP     MAIN2   ;LOOP TO TOP
;
;GOT KEY
;
KEY1:   LBI     0
        AISC    07      ;CONVERT BIT TO NUMBER
        LBI     09
        AISC    0CH
        LBI     06
        AISC    0EH
        LBI     03
        CBA
        LBI     TEMP3   ;ADD COLUMN + ROW
        ADD
        X       0       ;SAVE RESULT IN TEMP3
        LD      0       ;SET KEY?
        AISC    0EH
        JP      KEY3    ;YES- IGNORE DEBOUNCE
        LBI     KEYFLG
        SKMBZ   0       ;DEBOUNCE SET?
        JMP     MAIN2   ;YES- EXIT
        SMB     0       ;NO- SET DEBOUNCE FLAG
KEY3:   LBI     PWRFLG  ;CLEAR FUSE FLAG
        RMB     3
        JSRP    CHKTRN  ;CHECK IN WITH FREQ. INPUT
        LBI     WTRFLG  ;WATERING?
        SMB     0       ;(FLAG THAT UNIT HAS BEEN PROGRAMMED ON ANY KEY)
        SKMBZ   3
        JMP     KEY4    ;YES- ACCEPT ONLY PAUSE, OFF, & ZONE (ADVANCE)
        LBI     TEMP3
        LD      0
        AISC    0EH     ;SET KEY?
        JMP     SETMH   ;YES
        LBI     KEYTMR  ;NO- RESTART KEY TIMER
        STII    KEYVAL
        AISC    0CH     ;PROGRAM KEY?
        JMP     KEY6    ;NO- VECTOR TO NORMAL CODE
        LBI     MODE
        LD      0
        COMP            ;SEE IF IN A PROGRAM MODE ALRAEDY (START, ZONE, DAY)
        AISC    06
        JP      KEY6J   ;NO- DO NORMAL KEY PROCESSING
        CLRA
        SKMBZ   1       ;COMPARE MODE & KEY- SEE IF SAME
        AISC    0FH     ;DAYS MODE- ACC = -1
        SKMBZ   2
        AISC    0EH     ;ZONE MODE- ACC = -2
        AISC    08
        NOP
        SKMBZ   0       ;A OR B PROGRAM?
        AISC    03      ;B PGM
        LBI     TEMP3   ;KEY MATCH?
        SKE
KEY6J:  JMP     KEY6    ;KEY & CURRENT MODE DON'T MATCH OR DOESN'T APPLY
        LBI     MODE    ;MATCH- VECTOR TO INCREMENT ROUTINE
        SKMBZ   1
        JMP     INCDAY
        SKMBZ   2
        JMP     INCZN
        JMP     NXTSTR  ;ADVANCE TO NEXT START TIME ON PROGRAM
;
```

```
;HERE FOR KEY WHEN WATERING
;
KEY4:   LBI     TEMP3       ;GET KEYCODE
        CLRA
        AISC    03
        SKE
        JMP     KEY66
STOPW:  JSR     CLRSTR      ;CANCEL ALL PENDING STARTS
        JSRP    ENDW        ;STOP WATER CYCLE
KEY66:  AISC    02
        SKE
        JP      KEY7
PAUSE:  LBI     WTRFLG      ;FLIP PAUSE FLAG
        CLRA
        AISC    04
        XOR
        X       0
        SKMBZ   2
        JSRP    WTROFF      ;TURN WATER OFF AND GO TO MAIN (DISPLAY)
        JMP     WTRON       ;TURN WATER ON AND GO TO MAIN (DISPLAY)
KEY7:   AISC    01
        SKE
        JP      KEY8
        JP      MANADV      ;ZONE ADAVNCE
KEY8:   AISC    03
        SKE
        JSRP    MAIN        ;IGNORE- INVALID WHILE WATERING
MANADV: LBI     WTRFLG      ;IF PAUSED, IGNORE ZONE ADVANCE
        SKMBZ   2
        JSRP    MAIN
        JMP     NXTZON      ;ADVNCE TO NEXT ZONE
;
;KEY VECTOR TABLE FOR NORMAL KEY PROCESSING
;
        IF      ($ GT 0702H)
        JP      ADRERR              ;KEY PAGE OVER 0700 HEX ADDRESS
        ENDIF
        ORG     0702H
;
KEYVEC: .ADDR   TIME
        .ADDR   OFFON
        .ADDR   DAY
        .ADDR   MANUAL
        .ADDR   ZONEA
        .ADDR   DAYA
        .ADDR   STARTA
        .ADDR   ZONEB
        .ADDR   DAYB
        .ADDR   STARTB
;
;
KEY6:   CLRA
        IF      (KEYVEC AND 0F0H)
        AISC    ((KEYVEC AND 0F0H) / 010H)
        ENDIF
        LBI     TEMP3
        JID
;
;KEY FUNCTIONS
;
RAIN:   LBI     0CH
MANAB:  LBI     09
DAYA:   LBI     02
```

```
DAYB:   LBI     03
TIME:   LBI     0AH
DAYMOD: LBI     0BH
SETMOD: CBA
        LBI     MODE
        X       0           ;SAVE
        LBI     DSPNUM
        STII    0           ;SET DSPNUM TO ZERO
        JSRP    MAIN        ;BACK TO THE TOP- UPDATE DISPLAY TOO
;
;DAY KEY COMES HERE
;
DAY:    LBI     MODE        ;IF IN PROG. IN INTERVAL MODE, SET TO "TODAY"
        LD      0
        COMP
        AISC    06H
        JP      DAYMOD      ;NOT IN PRG. DAY MODE- SET TO CLOCK DAY OF WEEK MODE
        SKMBZ   0
        LBI     DAYSBH
        LBI     DAYSAH
        SKMBZ   3           ;CHECK IF IN INTERVAL MODE
        JP      DAYMOD
        LBI     DSPNUM      ;YES- ALWAYS SET TO "TODAY" MODE
        STII    01
        CLRA
        AISC    02
        LBI     MODE
        SKMBZ   0           ;SET TO PROGRAM A OR B "TODAY" MODE
        AISC    01
        XAD     MODE
        JSRP    MAIN
;
;INCREMENT DAY MODE (INTERVAL OR PGM WEEK)
;
INCDAY: LBI     DSPNUM      ;
        JSRP    INCHEX      ;INC TO NEXT MODE
        COMP
        AISC    07          ;OVER 7?
        JMP     RESNUM      ;YES
        LBI     MODE        ;NO- SEE IF INTERVAL MODE
        SKMBZ   0
        LBI     DAYSBH
        LBI     DAYSAH
        SKMBZ   3
        JSRP    MAIN        ;WEEK DAYS- EXIT AS IS
        AISC    0BH         ;INTERVAL- LIMIT MODE TO A 0-2 NUMBER
RESNUM: LBI     DSPNUM
        LBI     TEMP1       ;DUMMY CELL
        STII    0
        JSRP    MAIN
;
;
;ZONE KEYS COME HERE
;
ZONEA:  LBI     04
ZONEB:  LBI     05
        LDD     MODE        ;IF ALREADY MANUAL MODE, FLIP TO MAN. ZONE
        AISC    06
        AISC    04
        JMP     SETMOD      ;NOT MANUAL, SET NORMAL ZONE MODE
        LBI     08          ;MANUAL- SET MAN ZONE MODE
        AISC    0DH
        AISC    01
```

```
            AISC    07
            JSRP    MAIN        ;NO WRAP
            LBI     MODE
            STII    06          ;WRAP TO MANUAL A MODE (6)
            JSRP    MAIN
;
;OFF/ON KEY COMES HERE (ONLY WHEN NOT WATERING)
;
;NOTE: IGNORE KEY SET TIMER FOR TOGGLING ON/OFF FUNCTIONS
;
OFFON:      LDD     MODE
            AISC    0EH
            JMP     STROFF
            AISC    0FH
            JMP     TOGGLA
            AISC    0FH
            JMP     TOGGLB
            AISC    0EH
            JMP     ZONOFF
            AISC    0CH
            JMP     STRWTR      ;ON/OFF KEY STARTS MANUAL CYCLE
            AISC    0EH
            JMP     RAIN
            JMP     TIME
;
;START MODE OFF FUCNTION
;
STROFF:     JSR     STSUB1      ;SCAN FOR NEXT AVAIL START IF OFF POS.
            JSRP    MAIN        ;ERROR- NO MORE STARTS AVAILABLE
            JSR     STSTPG      ;SET START TO CURRENT PROGRAM
            SKC                 ;CARRY CLEAR IF NEW START TIME
            JSRP    NEWSUM      ;JUST TURNED ON (MINUTES SET TO ZERO)
            STII    0CH         ;TURN OFF
            JSRP    NEWSUM
;
;ZONE MODE OFF FUNCTION
;
ZONOFF:     JSR     CHKZON      ;IS ZONE OFF?
            JMP     STZON3      ;OFF OR ON DIFF. PROG.- TURN ON & SET TO PROGRAM
            JSR     ZONPTR      ;WAS ON- TURN OFF
            STII    0
            STII    0
;
;COPY CURRENT ZONE TIME TO RAM COPY FOR RAM VALIDATION
;
SAVZON:     JSR     ZONPTR      ;COPY CURRENT ZONE TO RAM COPY
            JSRP    LDXIS
            XAD     TEMP1
            LD      0
            XAD     TEMP2
            XABR
            AISC    07
            XABR
            LDD     TEMP2
            XDS     0
            LDD     TEMP1
            X       0
            JSRP    NEWSUM      ;EXIT TO MAIN, CALC NEW CHECKSUM
;
;DAYS TOGGLE VIA ON/OFF KEY
;
```

```
TOGGLA: LBI     DAYSAH
TOGGLB: LBI     DAYSBH
        SKMBZ   3               ;INTERVAL OR WEEKDAYS?
        JP      TOGD1           ;WEEK DAYS
        LDD     DSPNUM          ;INTERVAL
        AISC    0EH             ;SEE IF SCREEN TWO (MODE TOGGLE)
        JSRP    MAIN            ;NO- IGNORE KEY
        XAD     DSPNUM          ;YES- RESET DSPNUM TO ZERO
        SMB     3               ;SET TO WEEK DAY MODE
        JSRP    NEWSUM          ;EXIT WITHOUT TOGGLE
;
TOGD1:  LDD     DSPNUM          ;IN TOGGLE SCREEN?
        AISC    09H
        JP      TOGD2           ;NO- FLIP BIT ON/OFF
        JMP     STDY3           ;YES- SWITCH TO INTERVAL MODE
TOGD2:  LD      0               ;POINT AT LSD OF WEEK DAYS
        XDS     01
        CBA                     ;SAVE POINTER
        XAD     TEMP1
        LDD     DSPNUM
        SC
        JSR     TSTBIT          ;IS BIT CURRENTLY ON OR OFF?
        RC
        LDD     TEMP1
        CAB                     ;RESTORE LSD POINTER (BR NOT CHANGED BY TSTBIT)
        LDD     DSPNUM
        SKC
        JP      TOGD3
        JSR     CLRBIT          ;FLIP BIT TO OFF
        JSRP    NEWSUM
TOGD3:  JSR     SETBIT          ;FLIP BIT TO ON
        JSRP    NEWSUM
;
;
;ADD 8 BITS TO CHECKSUM
;
ADCHK8: JSR     AD8
        LBI     TEMP1           ;ADD IN CARRY IF ANY
        STII    0
        STII    0
        LBI     TEMP1
        JMP     ADCHK
;
;END OF CODE
;
        END
```

What is claimed is:

1. A multiple program controlled irrigation system which comprises: first means for dispensing an irrigation medium to a first zone in accordance with a first program; second means for dispensing the irrigation medium to a second zone in accordance with a second program; means for establishing a first start time and a second start time at which dispensing of the irrigation medium may begin; drive circuitry for said first and second dispensing means; means for selectively assigning the first start time and the second start time in a predetermined combination to first and second portions of said drive circuitry in accordance with the first and second programs for controlling the first dispensing means and/or the second dispensing means to initiate the dispensing of the irrigation medium to the first zone and/or to the second zone in accordance with the assignment of the first and second start times wherein such assignment is referred to as an existing assignment; such existing assignment by the assigning means being in any combination including the combination of assigning no start times to one of the first dispensing means and the second dispensing means and assigning both the first start time and the second start time to the other of the first dispensing means and the second dispensing means; means for changing either or both of the assignments of the first start time and/or the second start time from one of said portions of said drive circuitry to the other of said portions of said drive circuitry and from the existing assignment to a next assignment for controlling the other of the first dispensing means and the second dispensing means to initiate the dispensing of the irrigation medium to the first zone and/or to the second zone in accordance with the next assignment of the start times; and which further comprises means for placing the start times into one of three categories including, (A) assigned to said first dispensing means, (B) assigned to said second dispensing means, and (C) unassigned and available; and which further comprises means, responsive to an effort by the changing means, for locating any start times in category (C) and presenting at least one of such start times to the changing means.

2. A multiple program controlled irrigation system which comprises: first means for dispensing an irrigation medium to a first zone in accordance with a first program; second means for dispensing the irrigation medium to a second zone in accordance with a second program; means for establishing a first start time and a second start time at which dispensing of the irrigation medium may begin; drive circuitry for said first and second dispensing means; means for selectively assigning the first start time and the second start time in a predetermined combination to first and second portions of said drive circuitry in accordance with the first and second programs for controlling the first dispensing means and/or the second dispensing means to initiate the dispensing of the irrigation medium to the first zone and/or to the second zone in accordance with the assignment of the first and second start times wherein such assignment is referred to as an existing assignment; such existing assignment by the assigning means being in any combination including the combination of assigning no start times to one of the first dispensing means and the second dispensing means and assigning both the first start time and the second start time to the other of the first dispensing means and the second dispensing means; means for changing either or both of the assignments of the first start time and/or the second start time from one of said portions of said drive circuitry to the other of said portions of said drive circuitry and from the existing assignment to a next assignment for controlling the other of the first dispensing means and the second dispensing means to initiate the dispensing of the irrigation medium to the first zone and/or to the second zone in accordance with the next assignment of the start times; and which further comprises means for placing the start times into one of three categories including, (A) assigned to said first dispensing means, (B) assigned to said second dispensing means, and (C) unassigned and available; which further comprises means, for determining that there are no start times located in category (C); and means for moving the assignment of a selected start time from either of category (A) or category (B) to category (C).

3. The multiple program controlled irrigation system as set forth in claim 2, and which further comprises: means, responsive to an effort by the changing means, for locating any start times in category (C) and presenting at least one of such start times to the changing means.

4. A multiple controlled irrigation system, which comprises: first means for dispensing an irrigation medium to a first zone in accordance with a first program; second means for dispensing the irrigation medium to a second zone in accordance with a second program; means for establishing a first start time and a second start time at which dispensing of the irrigation medium may begin; drive circuitry for said first and second dispensing means; means for selectively assigning the first start time and the second start time in a predetermined combination to first and second portions of said drive circuitry in accordance with the first and second programs for controlling the first dispensing means and/or the second dispensing means to initiate the dispensing of the irrigation medium to the first zone and/or to the second zone in accordance with the assignment of the first and second start times wherein such assignment is referred to as an existing assignment; such existing assignment by the assigning means being in any combination including the combination of assigning no start times to one of the first dispensing means and the second dispensing means and assigning both the first start time and the second start time to the other of the first dispensing means and the second dispensing means; means for changing either or both of the assignments of the first start time and/or the second start time from one of said portions of said drive circuitry to the other of said portions of said drive circuitry and from the existing assignment to a next assignment for controlling the other of the first dispensing means and the second dispensing means to initiate the dispensing of the irrigation medium to the first zone and/or to the second zone in accordance with the next assignment of the start times; which further comprises: means for providing for the operation of the first dispensing means and the second dispensing means on at least two days; the establishing means establishing a first start time and a second start time for each of the two days; and the assigning means selectively assigning the first start time and the second start time to the first dispensing means and/or to the second dispensing means in a predetermined combination of each of the two days.

5. A multiple controlled irrigation system, which comprises: first means for dispensing an irrigation medium to a first zone in accordance with a first program; second means for dispensing the irrigation medium to a second zone in accordance with a second program; means for establishing a first start time and a second start time at which dispensing of the irrigation medium may begin; drive circuitry for said first and second dispensing means; means for selectively assigning the first start time and the second start time in a predetermined combination to first and second portions of said drive circuitry in accordance with the first and second programs for controlling the first dispensing means and/or the second dispensing means to initiate the dispensing of the irrigation medium to the first zone and/or to the second zone in accordance with the assignment of the first and second start times wherein such assignment is referred to as an existing assignment; such existing assignment by the assigning means being in any combination including the combination of assigning no start times to one of the first dispensing means and the second dispensing means and assigning both the first start time and the second start time to the other of the first dispensing means and the second dispensing means; means for changing either or both of the assignments of the first start time and/or the second start time from one of said portions of said drive circuitry to the other of said portions and from the existing assignment to a next assignment for controlling the other of the first dispensing means and the second dispensing means to initiate the dispensing of the irrigation medium to the first zone and/or to the second zone in accordance with the next assignment of the start times; wherein at least the first means is for applying the irrigation medium in succession to at least two zones which are designated in an order of succession from a low zone designation to a higher zone designation, and wherein the irrigation system further comprises: means for controlling the first means to initiate the application of the irrigation medium to the low zone in accordance with the start time assigned thereto and then to intimate the application of the irrigation medium to the higher zone in accordance with the start time assigned thereto.

6. An irrigation control system comprising: and electric control circuit including a microprocessor; output circuit connecting said control circuit to a plurality of irrigation solenoid valves respectively controlling first and second groups of water dispenser located in two corresponding groups of watering zones in designated areas to be irrigated to enable said control circuit to supply drive signals to said solenoid valves; input circuitry connected to said control circuitry including a keypad; first means included in said control circuitry for establishing two independent water start time programs (Program A and Program B) for respective ones of said first and second groups of dispensers as selected by the operation of said keypad, with a predetermined number of start times being assignable in any combination to either of said programs; second means included in said control circuit for changing by operation of said keypad at least one start time in one of the programs to the other program to change the irrigation solenoid valves in said watering zones controlled by the selected start time in Program A, to the irrigation solenoid valves in said watering zones controlled by Program B; and third means included in said control circuit for establishing by operation of said keypad the run time associated with each of the start times of the two programs.

7. The irrigation control system defined in claim 6, and which includes fourth means included in said control circuit for establishing by operation of said keypad a day-interval watering mode in which watering occurs with pre-set intervals between watering days, or a weekday watering mode in which watering occurs only during selected days of the week for each of said programs.

8. The irrigation control system defined in claim 6, and which includes fifth means included in said control circuit for establishing by operation of said keypad a manual watering mode for each of said programs.

* * * * *